(12) United States Patent
Kodama et al.

(10) Patent No.: US 10,537,848 B2
(45) Date of Patent: Jan. 21, 2020

(54) GAS SEPARATION ASYMMETRIC MEMBRANE, GAS SEPARATION MODULE, GAS SEPARATION DEVICE, AND GAS SEPARATION METHOD

(71) Applicant: FUJIFILM Corporation, Tokyo (JP)

(72) Inventors: Keisuke Kodama, Kanagawa (JP); Satoshi Sano, Kanagawa (JP); Koji Hironaka, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 218 days.

(21) Appl. No.: 15/669,970

(22) Filed: Aug. 7, 2017

(65) Prior Publication Data

US 2017/0333836 A1    Nov. 23, 2017

Related U.S. Application Data

(63) Continuation of application No. PCT/JP2016/052890, filed on Feb. 1, 2016.

(30) Foreign Application Priority Data

Feb. 27, 2015  (JP) .................................. 2015-039089

(51) Int. Cl.
*B01D 53/22*    (2006.01)
*B01D 69/12*    (2006.01)
(Continued)

(52) U.S. Cl.
CPC ............ *B01D 53/228* (2013.01); *B01D 69/02* (2013.01); *B01D 69/06* (2013.01); *B01D 69/08* (2013.01);
(Continued)

(58) Field of Classification Search
CPC ...... B01D 53/22; B01D 53/228; B01D 71/64; B01D 71/70; B01D 2257/504;
(Continued)

(56) References Cited

U.S. PATENT DOCUMENTS 4,717,393 A    1/1988  Hayes
5,428,123 A *  6/1995  Ward .................... B01D 69/08
                                         210/500.21
(Continued)

FOREIGN PATENT DOCUMENTS

JP    S63-111921    5/1988
JP    H09225276    9/1997
(Continued)

OTHER PUBLICATIONS

English language machine translation for JP 2014-176795. Retrieved from http://translationportal.epo.org on May 7, 2019. (Year: 2019).*
(Continued)

*Primary Examiner* — Jason M Greene
(74) *Attorney, Agent, or Firm* — JCIPRNET

(57) ABSTRACT

A gas separation asymmetric membrane includes a porous layer having gas permeability; and a compact layer having gas separation capability which is formed on the porous layer in which the gas separation asymmetric membrane is formed using a polyimide compound which has a structural unit represented by Formula (I) and at least one structural unit selected from a structural unit represented by Formula (II) or a structural unit represented by Formula (III) and in which the viscosity, at 25° C., of a solution obtained by dissolving the polyimide compound in N-methylpyrrolidone
(Continued)

at a concentration of 5% by mass is in a range of 2.2 to 22.0 mPa·sec,

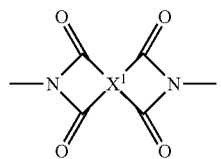

Formula (I)

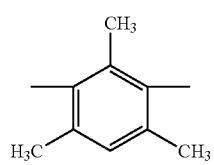

Formula (II)

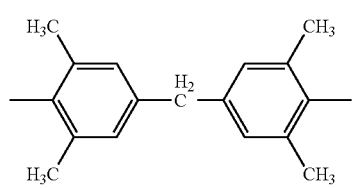

Formula (III)

in the formula, $X^1$ represents a group having a structure represented by Formula (I-a) or (I-b).

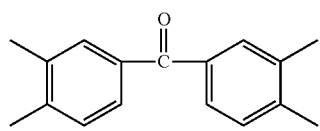

Formula (I-a)

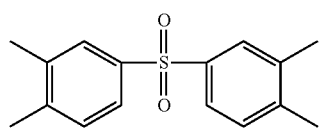

Formula (I-b)

15 Claims, 1 Drawing Sheet

(51) Int. Cl.
| | | |
|---|---|---|
| *B01D 71/64* | (2006.01) | |
| *B01D 71/70* | (2006.01) | |
| *C08G 73/10* | (2006.01) | |
| *B01D 69/02* | (2006.01) | |
| *B01D 69/06* | (2006.01) | |
| *B01D 69/08* | (2006.01) | |
| *C10L 3/10* | (2006.01) | |

(52) U.S. Cl.
CPC ............ *B01D 69/12* (2013.01); *B01D 71/64* (2013.01); *B01D 71/70* (2013.01); *C08G 73/105* (2013.01); *C08G 73/1039* (2013.01); *C08G 73/1042* (2013.01); *C08G 73/1053* (2013.01); *C08G 73/1064* (2013.01); *C08G 73/1067* (2013.01); *C08G 73/1078* (2013.01); *B01D 2256/245* (2013.01); *B01D 2257/504* (2013.01); *B01D 2325/022* (2013.01); *C10L 3/104* (2013.01); *C10L 2290/548* (2013.01); *Y02C 10/10* (2013.01); *Y02P 20/152* (2015.11)

(58) Field of Classification Search
CPC .......... B01D 2325/022; B01D 2323/30; C08G 73/1042; C08G 73/1053; C08G 73/1064; C08G 73/1067; C10L 3/104
See application file for complete search history.

(56) References Cited

U.S. PATENT DOCUMENTS

| | | | |
|---|---|---|---|
| 7,485,173 B1* | 2/2009 | Liu | B01D 53/228 210/640 |
| 2005/0145107 A1* | 7/2005 | Kessler | B01D 53/228 95/45 |
| 2005/0268782 A1* | 12/2005 | Kulkarni | B01D 53/228 96/4 |
| 2008/0143014 A1 | 6/2008 | Tang | |
| 2010/0269698 A1* | 10/2010 | Yates | B01D 53/228 96/10 |
| 2011/0290112 A1 | 12/2011 | Liu et al. | |
| 2012/0322911 A1* | 12/2012 | Liu | B01D 53/228 522/164 |
| 2013/0255490 A1* | 10/2013 | Matteucci | B01D 53/228 95/51 |
| 2014/0144324 A1 | 5/2014 | Yamanaka et al. | |
| 2014/0290478 A1 | 10/2014 | Liu et al. | |

FOREIGN PATENT DOCUMENTS

| | | | | |
|---|---|---|---|---|
| JP | 2007-297605 | | 11/2007 | |
| JP | 2010-513021 | | 4/2010 | |
| JP | 2013-528118 | | 7/2013 | |
| JP | 2014-128787 | | 7/2014 | |
| JP | 2014-176795 | * | 9/2014 | ............. B01D 53/22 |
| JP | 2014-523338 | | 9/2014 | |

OTHER PUBLICATIONS

"Notification of Reasons for Refusal of Japanese Counterpart Application," dated Mar. 13, 2018, with English translation thereof, pp. 1-11.

"International Search Report (Form PCT/ISA/210) of PCT/JP2016/052890", with English translation thereof, dated Apr. 26, 2016, pp. 1-4.

"Written Opinion (Form PCT/ISA/237)", dated Apr. 26, 2016, with English translation thereof, pp. 1-9.

* cited by examiner

GAS SEPARATION ASYMMETRIC MEMBRANE, GAS SEPARATION MODULE, GAS SEPARATION DEVICE, AND GAS SEPARATION METHOD

CROSS-REFERENCE TO RELATED APPLICATIONS

This application is a Continuation of PCT International Application No. PCT/JP2016/052890, filed on Feb. 1, 2016, which claims priority under 35 U.S.C. § 119(a) to Japanese Patent Application No. 2015-039089, filed on Feb. 27, 2015. Each of the above application(s) is hereby expressly incorporated by reference, in its entirety, into the present application.

BACKGROUND OF THE INVENTION

1. Field of the Invention

The present invention relates to a gas separation asymmetric membrane, a gas separation module, a gas separation device, and a gas separation method.

2. Description of the Related Art

A material formed of a polymer compound has a gas permeability specific to the material. Based on this property, it is possible to cause selective permeation and separation out of a target gas component using a membrane formed of a specific polymer compound. As an industrial application for this gas separation membrane related to the problem of global warming, separation and recovery from large-scale carbon dioxide sources using this gas separation membrane has been examined in thermal power plants, cement plants, or ironworks blast furnaces. Further, this membrane separation technique has been attracting attention as a means for solving environmental issues which can be performed with relatively little energy. In addition, natural gas or biogas (gas generated due to fermentation or anaerobic digestion, for example, biological excrement, organic fertilizers, biodegradable substances, sewage, garbage, or energy crops) is mixed gas mainly containing methane and carbon dioxide, and a membrane separation method is being examined as a means for removing impurities such as the carbon dioxide and the like (JP2007-297605A).

In purification of natural gas using a membrane separation method, excellent gas permeability and separation selectivity are required in order to more efficiently separate gas. Various membrane materials have been examined for the purpose of realizing excellent gas permeability and separation selectivity and a gas separation membrane using a polyimide compound has been examined as part of examination of membrane materials (for example, JP2013-528118A and JP2014-523338A).

SUMMARY OF THE INVENTION

In order to obtain a practical gas separation membrane, it is necessary to ensure sufficient gas permeability and gas separation selectivity by making a gas separation layer thinner. As a method for this, a method of making a portion contributing to separation into a thin layer referred to as a compact layer or a skin layer by forming a polymer compound such as a polyimide compound into an asymmetric membrane using a phase separation method may be exemplified. In this asymmetric membrane, a portion other than a compact layer is allowed to function as a support layer responsible for the mechanical strength of a membrane.

Moreover, in an actual plant, a membrane is plasticized due to high-pressure conditions and impurities (for example, benzene, toluene, and xylene) present in natural gas and this leads to degradation of separation selectivity, which is problematic. Therefore, the resistance to impurities such as toluene is an important factor for practical use of a gas separation membrane.

Further, since a gas separation membrane is typically used under high-pressure conditions, mechanical strength that does not cause film defects even under high-pressure conditions is required. In addition, a gas separation membrane is typically used in the form of a package filled with a gas separation membrane, which is referred to as a module or an element. This package is densely filled with a gas separation membrane in order to increase the film surface area. For example, a gas separation membrane in the flat membrane form fills the package by being folded in a spiral shape and then is used as a gas separation module. Therefore, a gas separation membrane needs to have mechanical strength and flexibility (folding resistance).

An object of the present invention is to provide a gas separation asymmetric membrane in which both of gas permeability and gas separation selectivity are realized at high levels and which is unlikely to be plasticized even in the presence of impurities such as toluene, exhibits excellent gas separation performance even under conditions of a high temperature, a high pressure, and a high humidity, has excellent folding resistance, and can be produced at a high yield. Further, another object of the present invention is to provide a gas separation module which includes the gas separation asymmetric membrane, a gas separation device, and a gas separation method.

The present inventors conducted intensive research in view of the above-described problems. As the result, it was found that the above-described problems can be solved by using an asymmetric membrane formed using a polyimide compound which has a constitutional unit having a specific structure and in which the viscosity of a solution obtained by dissolving the polyimide compound in N-methylpyrrolidone at a specific concentration is in a specific range, as a gas separation membrane. The relationship between the physical properties of a polyimide compound used for forming a gas separation membrane based on the viscosity of a solution having a specific concentration and the gas separation performance thereof has not been known or focused. The present inventors found that a polyimide compound having a high predetermined viscosity when dissolved in a solution at a specific concentration can be successfully synthesized by precisely controlling the purity or the equivalent of a monomer at the time of synthesizing the polyimide compound and the above-described problems can be solved by producing a gas separation membrane using this polyimide compound, thereby completing the present invention.

The above-described object has been achieved by the following means.

[1] A gas separation asymmetric membrane comprising: a porous layer having gas permeability; and a compact layer having gas separation capability which is formed on the porous layer, in which the gas separation asymmetric membrane is formed using a polyimide compound which has a structural unit represented by Formula (I) and at least one structural unit selected from a structural unit represented by Formula (II) or a structural unit represented by Formula (III) and in which the viscosity, at 25° C., of a solution obtained by dissolving the polyimide compound in N-methylpyrrolidone at a concentration of 5% by mass is in a range of 2.2 to 22.0 mPa·sec, Formula (I)

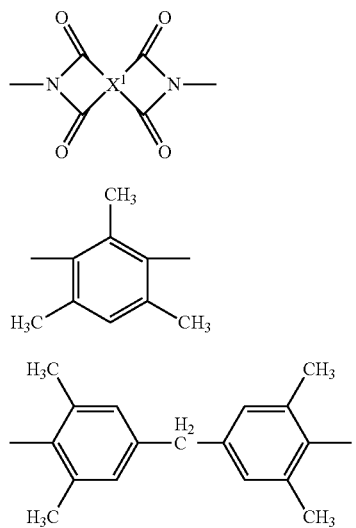

in the formula, $X^1$ represents a group having a structure represented by Formula (I-a) or (I-b).

Formula (I-a)

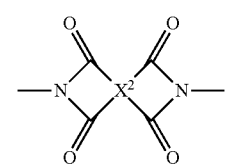

Formula (I-b)

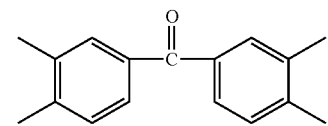

[2] The gas separation asymmetric membrane according to [1], in which the polyimide compound further has a structural unit represented by Formula (IV), Formula (IV)

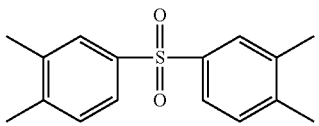

in the formula, $X^2$ represents a group having a structure represented by any of Formulae (IV-a) to (IV-n), (IV-a)

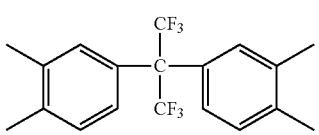

(IV-b)

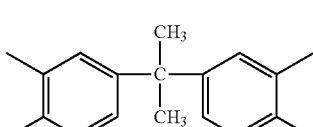

(IV-c)

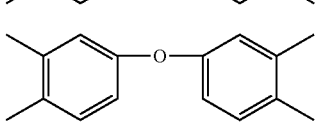

(IV-d)

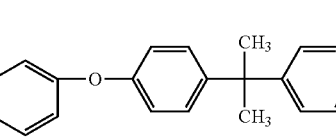

(IV-e)

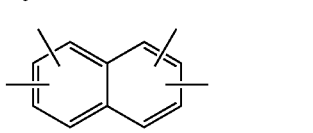

(IV-f)

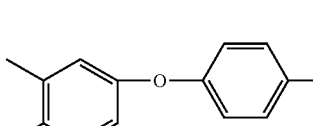

(IV-g)

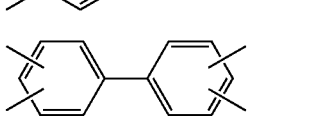

(IV-h)

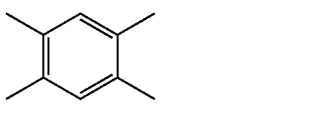

(IV-i)

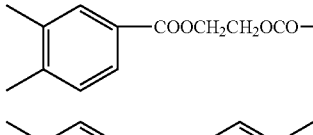

(IV-j)

(IV-k)

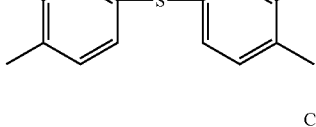

(IV-l)

(IV-m)

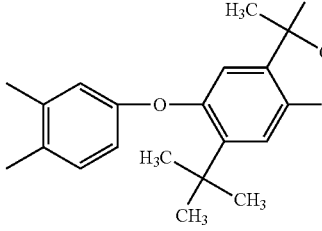

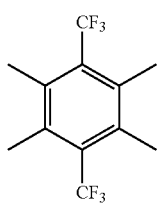
(IV-n)

where $X^2$ does not represent a group having a structure represented by Formula (IV-a) in a case where the polyimide compound has the structural unit of Formula (I) in which $X^1$ represents a group having a structure represented by Formula (I-a), and $X^2$ does not represent a group having a structure represented by Formula (IV-b) in a case where the polyimide compound has the structural unit of Formula (I) in which $X^1$ represents a group having a structure represented by Formula (I-b).

[3] The gas separation asymmetric membrane according to [2], in which the polyimide compound further has at least one structural unit selected from structural units represented by each of Formulae (V-a) to (V-n).

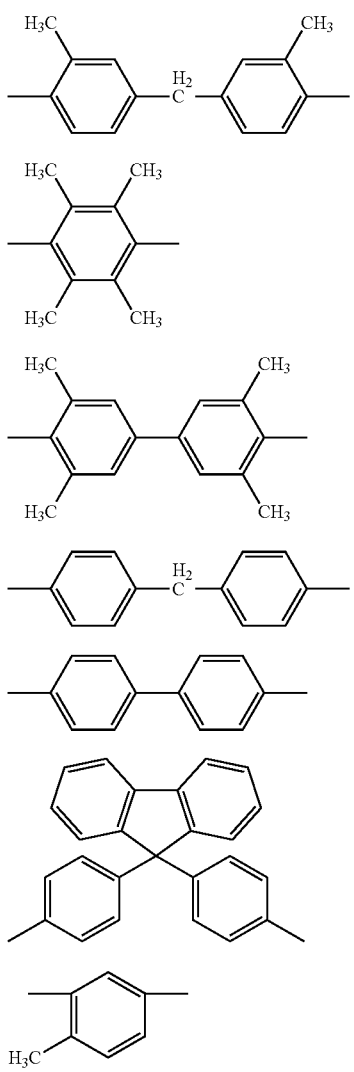

(V-h)

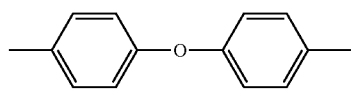
(V-i)

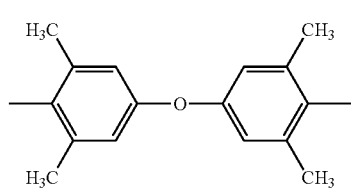
(V-j)

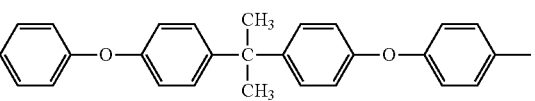
(V-k)

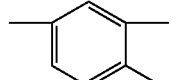
(V-l)

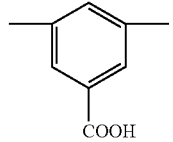
(V-m)

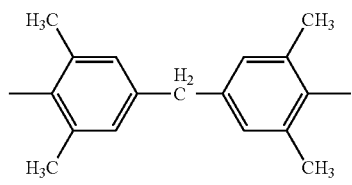
(V-n)

[4] The gas separation asymmetric membrane according to [3], in which a total molar amount a of the structural unit represented by Formula (I) to a total molar amount c of the structural unit represented by Formula (IV) in the polyimide compound satisfies an inequation of $0.2 \leq a/c$ and a total molar amount b of the structural units represented by each of Formulae (II) and (III) to a total molar amount d of the structural units represented by each of Formulae (V-a) to (V-n) in the polyimide compound satisfies an inequation of $0.1 \leq b/d \leq 20.0$.

[5] The gas separation asymmetric membrane according to any one of [1] to [4], in which a glass transition temperature of the polyimide compound is higher than 200° C.

[6] The gas separation asymmetric membrane according to any one of [1] to [5], further comprising: 10 to 5000 ppm of an organic solvent.

[7] The gas separation asymmetric membrane according to any one of [1] to [6], in which the compact layer contains 1% to 20% by mass of an insoluble component.

[8] The gas separation asymmetric membrane according to any one of [1] to [7], further comprising: a siloxane compound layer on the compact layer, in which a Si ratio of the siloxane compound layer before and after being immersed in chloroform calculated by Equation (I) is in a range of 0.6 to 1.0.

Si ratio=(Si—Kα X-ray intensity after immersion in chloroform)/(Si—Kα X-ray intensity before immersion in chloroform)   Equation (I)

[9] The gas separation asymmetric membrane according to [8], in which the siloxane compound layer contains an organopolysiloxane compound having a structure formed by siloxane compounds being linked to each other through a linking group selected from *—O-M-O—*, *—S-M-S—*, *—NR$^a$C(=O)—*, *—NR$^b$C(=O)NR$^b$—*, *—O—CH$_2$—O—*, *—S—CH$_2$CH$_2$—*, *—OC(=O)O—*, *—CH(OH)CH$_2$OCO—*, *—CH(OH)CH$_2$O—*, *—CH(OH)CH$_2$S—*, *—CH(OH)CH$_2$NR$^c$—*, *—CH(CH$_2$OH)CH$_2$OCO—*, *—CH(CH$_2$OH)CH$_2$O—*, *—CH(CH$_2$OH)CH$_2$S—*, *—CH(CH$_2$OH)CH$_2$NR$^c$—*, *—CH$_2$CH$_2$—*, *—C(=O)O$^-$N$^+$(R$^d$)$_3$—*, *—SO$_3$$^-$N$^+$(R$^e$)$_3$—*, and *—PO$_3$H$^-$N$^+$(R$^f$)$_3$—*, in the formulae, M represents a divalent to tetravalent metal atom, R$^a$, R$^b$, R$^c$, R$^d$, R$^e$, and R$^f$ each independently represent a hydrogen atom or an alkyl group, and the symbol * represents a linking site.

[10] The gas separation asymmetric membrane according to [9], in which the metal atom M is a metal atom selected from Be, Mg, Ca, Sc, Y, Ti, Zr, V, Cr, Mo, Mn, Fe, Co, Ni, Cu, Zn, B, Al, Ga, and In.

[11] The gas separation asymmetric membrane according to any one of [8] to [10], in which the siloxane compound layer has at least one structure selected from (i) or (ii), (i) a structure which has a structure represented by Formula (1) and a structure represented by Formula (2) or (3), or (ii) a structure represented by Formula (4),

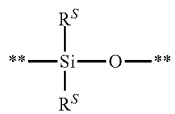

Formula (1)

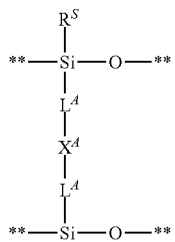

Formula (2)

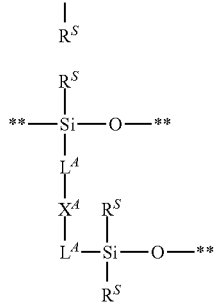

Formula (3)

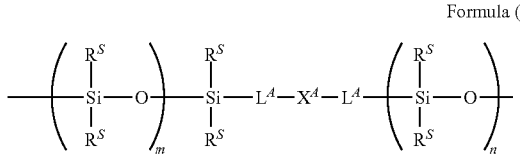

Formula (4)

in the formulae, R$^S$ represents an alkyl group or an aryl group, L$^A$ represents a single bond or a divalent linking group, X$^A$ represents a linking group selected from *—O-M$^1$-O—*, *—S-M$^1$-S—*, *—O—CH$_2$—O—*, *—S—CH$_2$CH$_2$—*, *—OC(=O)O—*, *—CH$_2$CH$_2$—*, and *—C(=O)O$^-$N$^+$(R$^d$)$_3$—*, M$^1$ represents Zr, Fe, Zn, B, Al, Ti, In, or Ga, R$^d$ represents a hydrogen atom or an alkyl group, m and n represent an integer of 2 or greater, the symbol * represents a linking site, and the symbol ** represents a linking site in a siloxane bond.

[12] The gas separation asymmetric membrane according to [11], in which the structure (i) further has a repeating unit represented by Formula (5).

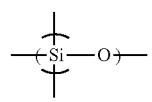

Formula (5)

[13] The gas separation asymmetric membrane according to [12], in which the content of the repeating unit represented by Formula (5) in the siloxane compound layer is in a range of 0.01 to 0.55.

[14] The gas separation asymmetric membrane according to any one of [1] to [13], which is used for selective permeation of carbon dioxide from gas containing carbon dioxide and methane.

[15] A gas separation module comprising: the gas separation asymmetric membrane according to any one of [1] to [14].

[16] A gas separation device comprising: the gas separation module according to [15].

[17] A gas separation method which uses the gas separation asymmetric membrane according to any one of [1] to [16].

[18] The gas separation method according to [17], comprising: selectively permeating carbon dioxide from gas containing carbon dioxide and methane.

In the present specification, when a plurality of substituents or linking groups (hereinafter, referred to as substituents or the like) shown by specific symbols are present or a plurality of substituents are defined simultaneously or alternatively, this means that the respective substituents or the like may be the same as or different from each other. The same applies to the definition of the number of substituents or the like. Moreover, in a case where there is a repetition of a plurality of partial structures shown by means of the same display in the formula, the respective partial structures or repeating units may be the same as or different from each other. In addition, even in a case where not specifically stated, when a plurality of substituents or the like are adjacent to each other, this means that they may be condensed or linked to each other and form a ring.

In regard to compounds described in the present specification, the description includes salts thereof and ions thereof in addition to the compounds.

A substituent (the same applies to a linking group) in which substitution or non-substitution is not specified in the present specification may include an arbitrary substituent of the group within a range in which desired effects are exhibited. The same applies to a compound in which substitution or non-substitution is not specified.

A group Z of substituents described below is set as a preferable range of a substituent in the present specification unless otherwise specified.

The gas separation asymmetric membrane, the gas separation module, and the gas separation device of the present invention realize both of gas permeability and gas separation selectivity at high levels. Further, the gas separation asymmetric membrane of the present invention is unlikely to be plasticized even in the presence of impurities such as toluene, exhibits excellent gas separation performance under conditions of a high temperature, a high pressure, and a high humidity, has excellent folding resistance, and can be produced at a high yield. According to the gas separation method of the present invention, it is possible to separate gas with higher permeability and higher selectivity. Further, high gas separation performance is maintained even when gas is separated under high-pressure conditions and impurities such as toluene are present in the gas.

DESCRIPTION OF THE PREFERRED EMBODIMENTS

Figure 1:
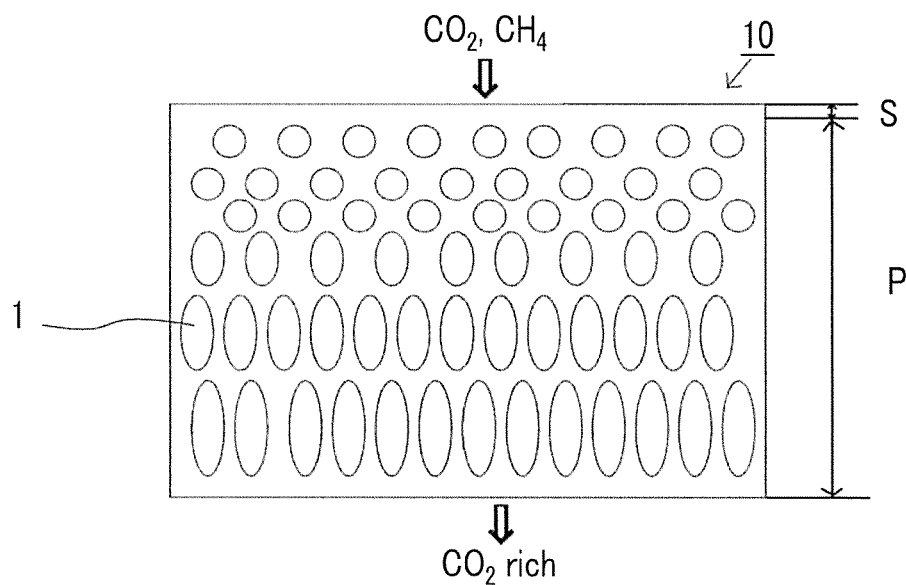
FIG. 1 is a view schematically illustrating an embodiment of a gas separation asymmetric membrane of the present invention.

Hereinafter, the present invention will be described in detail.

A gas separation asymmetric membrane of the present invention (hereinafter, also simply referred to as a "gas separation membrane of the present invention") is a gas separation membrane having an asymmetric structure, which includes a porous layer having gas permeability and a compact layer having gas separation capability which is formed on the porous layer. The gas separation membrane of the present invention is formed using a polyimide compound which has a specific structural unit and in which the viscosity, at 25° C., of a solution obtained by dissolving the polyimide compound in N-methylpyrrolidone at a concentration of 5% by mass is in a range of 2.2 to 22.0 mPa·sec.

[Polyimide Compound]

The polyimide compound used in the present invention has a structural unit represented by Formula (I). Further, the polyimide compound of the present invention has at least one structural unit selected from a structural unit represented by Formula (II) or a structural unit represented by Formula (III).

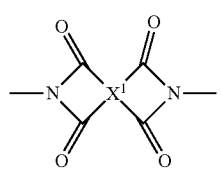

Formula (I)

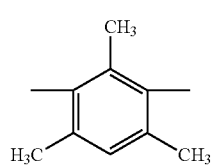

Formula (II)

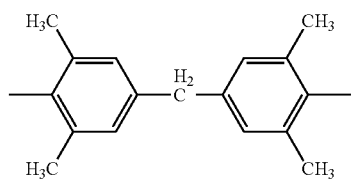

Formula (III)

In Formula (I), $X^1$ represents a group having a structure represented by Formula (I-a) or (I-b).

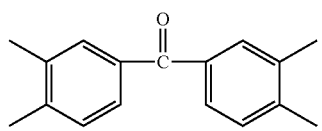

Formula (I-a)

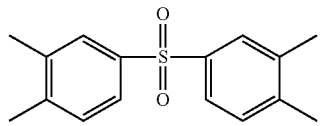

Formula (I-b)

When the polyimide compound used in the present invention has a structural unit represented by Formula (I), a crosslinked structure can be formed in —C(=O)— or —SO$_2$— in Formula (I-a) because of a radical generated from UV irradiation or a heat treatment and thus the polyimide compound can be cured. Further, the expression "the polyimide compound used in the present invention" indicates the polyimide compound before the crosslinked structure is formed (that is, a polyimide compound used for forming a gas separation membrane).

The above-described polyimide compound may have any one or both of a structural unit represented by Formula (II) and a structural unit represented by Formula (III).

It is preferable that the polyimide compound used in the present invention has a structural unit represented by Formula (IV). Here, the structural unit represented by Formula (IV) has a structure which is different from the structure represented by Formula (I).

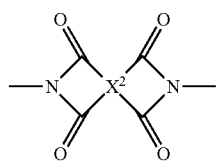

Formula (IV)

In Formula (IV), it is preferable that $X^2$ represents a group having a structure represented by any of Formulae (IV-1) to (IV-29).

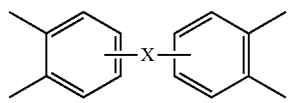

(IV-1)

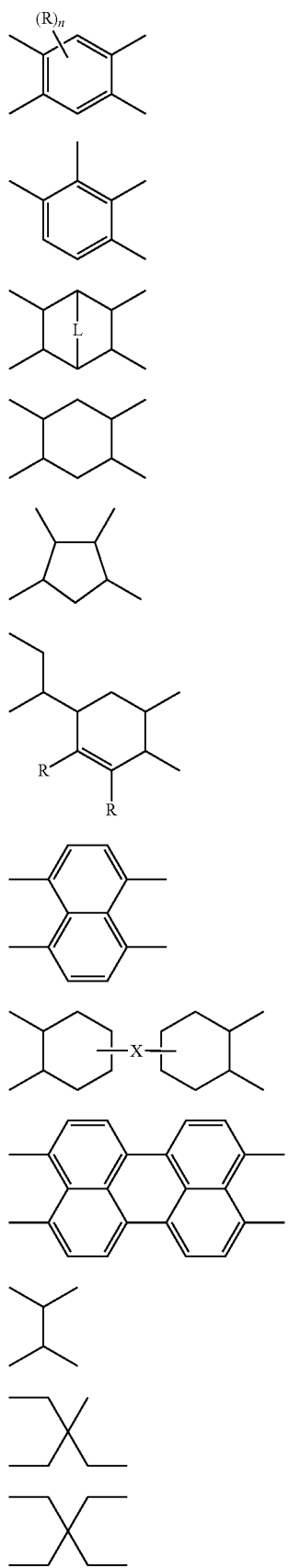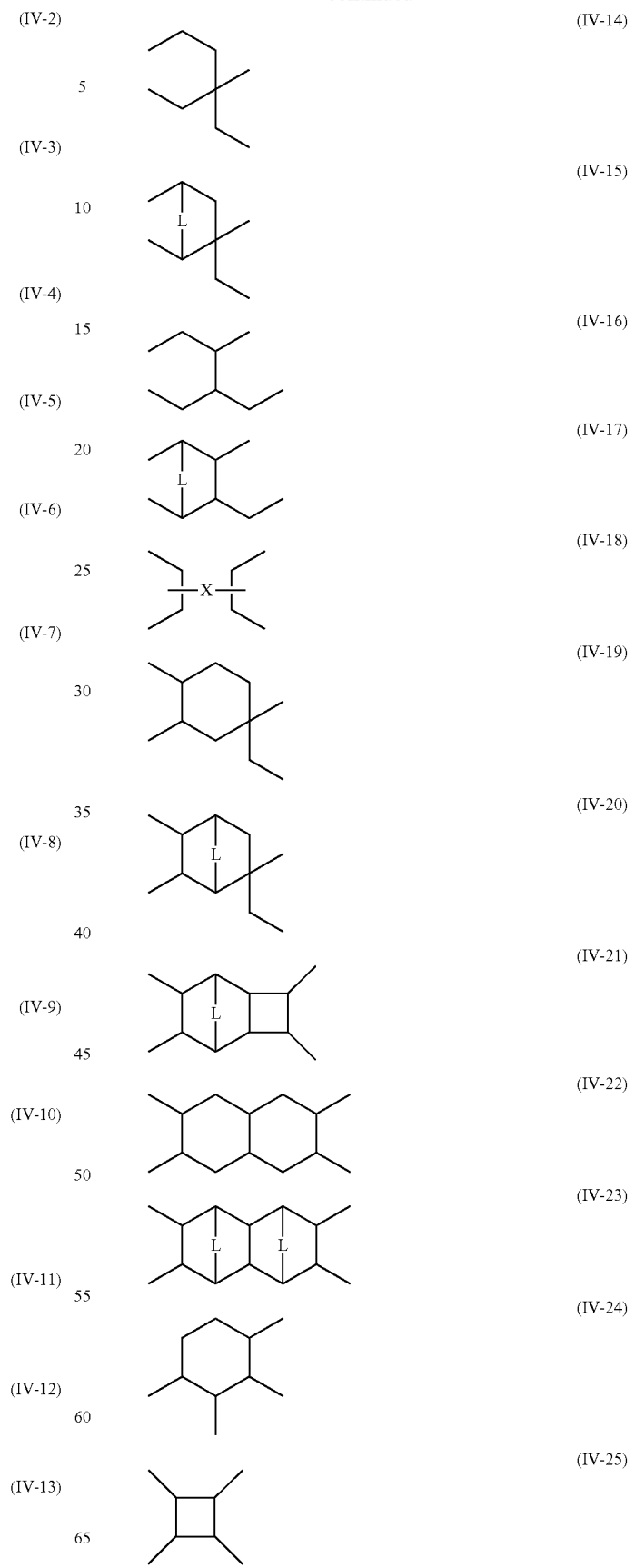

(IV-26)
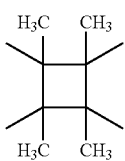

(IV-27)
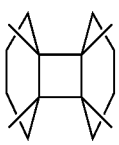

(IV-28)
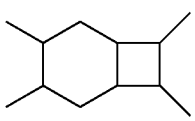

(IV-29)
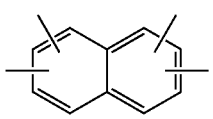

In Formulae (IV-1), (IV-9), and (IV-18), X represents a single bond or a divalent linking group. As the divalent linking group, —C(R$^x$)$_2$— (R$^x$ represents a hydrogen atom or a substituent, and in a case where R$^x$ represents a substituent, R$^x$'s may be linked to each other to form a ring), —O—, —SO$_2$—, —C(=O)—, —S—, —NR$^Y$— (R$^Y$ represents a hydrogen atom, an alkyl group (preferably a methyl group or an ethyl group), an aryl group (preferably a phenyl group)), —C$_6$H$_4$— (phenylene group), or a combination of these is preferable and a single bond or —C(R$^x$)$_2$— is more preferable. When R$^x$ represents a substituent, a group Z of substituents described below is specifically exemplified. Among these, an alkyl group (the preferable range is the same as that of the alkyl group in the group Z of substituents described below) is preferable, an alkyl group having a halogen atom as a substituent is more preferable, and trifluoromethyl is particularly preferable. Further, in regard to the expression "may be linked to each other to form a ring" in the present specification, the linkage may be made by a single bond or a double bond and a cyclic structure may be formed or condensation may be made and a condensed ring structure may be formed. Moreover, in Formula (I-18), X is linked to any one of two carbon atoms shown on the left side in the formula and linked to any one of two carbon atoms shown on the right side in the formula.

In Formulae (IV-4), (IV-15), (IV-17), (IV-20), (IV-21), and (IV-23), L represents —CH=CH— or —CH$_2$—.

In Formulae (IV-2) and (IV-7), R represents a substituent. Examples of the substituent as R include groups shown as examples of the group Z of substituents described below. R's may be bonded to each other to form a ring. In Formula (IV-2), n represents an integer of 0 to 2.

R represents preferably an alkyl group and more preferably a methyl group or an ethyl group.

The carbon atoms shown in Formulae (IV-1) to (IV-29) may further have substituents. Specific examples of the substituents are the same as the group Z of substituents described below. Among these, an alkyl group or an aryl group is preferable.

In Formula (IV), it is preferable that X$^2$ represents a group having a structure represented by any of Formulae (IV-a) to (IV-n). Here, X$^2$ does not represent a group having a structure represented by Formula (IV-a) in a case where the polyimide compound used in the present invention has the structural unit of Formula (I) in which X$^1$ represents a group having a structure represented by Formula (I-a). Further, X$^2$ does not represent a group having a structure represented by Formula (IV-b) in a case where the polyimide compound used in the present invention has the structural unit of Formula (I) in which X$^1$ represents a group having a structure represented by Formula (I-b).

(IV-a)
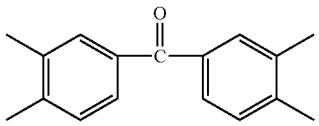

(IV-b)
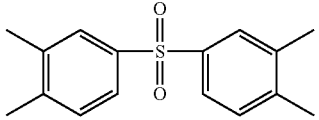

(IV-c)
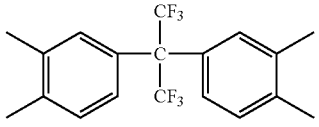

(IV-d)
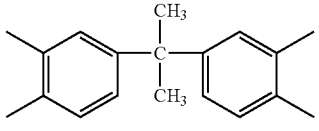

(IV-e)
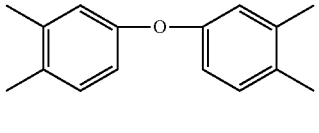

(IV-f)
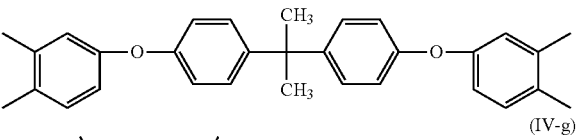

(IV-g)
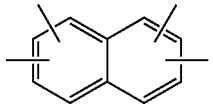

(IV-h)
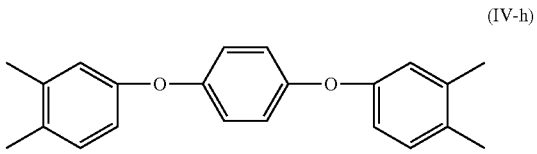

(IV-i)
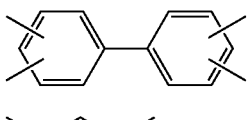

(IV-j)
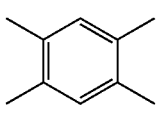

(IV-k)
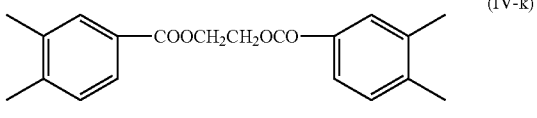

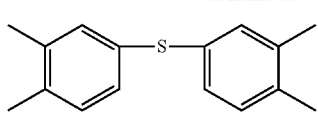
(IV-l)

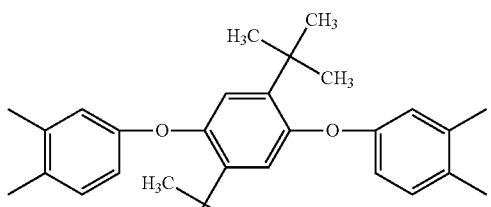
(IV-m)

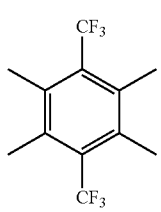
(IV-n)

Among them, $X^2$ represents preferably a group having a structure represented by any of Formulae (IV-a), (IV-b), (IV-c), (IV-d), (IV-e), (IV-j), and (IV-n) and more preferably a group having a structure represented by any of Formulae (IV-a) and (IV-b).

It is preferable that the polyimide compound used in the present invention has at least one structural unit represented by any of Formulae (V-1) to (V-4) in addition to the structural units represented by Formulae (I) to (IV).

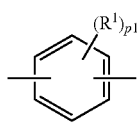
Formula (V-1)

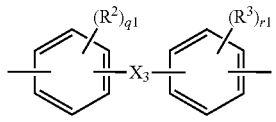
Formula (V-2)

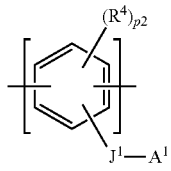
Formula (V-3)

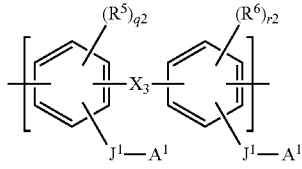
Formula (V-4)

In the formulae, $X^3$ has the same definition as that for X in Formula (IV-1) and the preferable range is the same as that of X.

$R^1$ represents an alkyl group or a halogen atom. The preferable ranges of the alkyl group, the amino group, and the halogen atom are the same as those of the alkyl group and the amino group, and the halogen atom exemplified in the section of the group Z of substituents described below. p1 showing the number of $R^1$'s represents an integer of 0 to 4.

$R^2$ and $R^3$ represent an alkyl group or a halogen atom or may be linked to each other to form a ring together with $X^3$. The preferable ranges of the alkyl group and the halogen atom as $R^2$ and $R^3$ are respectively the same as those of the alkyl group and the halogen atom exemplified in the section of the group Z of substituents described below. q1 and r1 respectively showing the number of $R^2$ and the number of $R^3$ represent an integer of 0 to 4.

In a case where $R^2$ and $R^3$ represent an alkyl group, a methyl group or an ethyl group is preferable and trifluoromethyl is also preferable.

$R^4$, $R^5$, and $R^6$ represent a substituent. Examples of the substituent include groups exemplified in the section of the group Z of substituents described below. $R^5$ and $R^6$ may be bonded to each other to form a ring together with $X^3$. p2, q2, and r2 respectively showing the number of $R^4$, the number of $R^5$, and the number of $R^6$ represent an integer of 0 to 4, preferably in a range of 0 to 2, and more preferably 0 to 1.

$J^1$ represents a single bond or a divalent linking group. As the linking group, *—COO$^-$N$^+$R$^{b1}$R$^{c1}$R$^{d1}$—** ($R^{b1}$ to $R^{d1}$ represent a hydrogen atom, an alkyl group, or an aryl group and the preferable ranges are the same as the preferable ranges exemplified in the section of the group Z of substituents described below), *—SO$_3^-$N$^+$R$^{e1}$R$^{f1}$R$^{g1}$—** ($R^{c1}$ to $R^{g1}$ represent a hydrogen atom, an alkyl group, or an aryl group and the preferable ranges are the same as the preferable ranges exemplified in the section of the group Z of substituents described below), an alkylene group, or an arylene group is preferable. The symbol * represent a binding site on the side of a phenylene group shown in the formulae described above and the symbol ** represents a binding site on the side of $A^1$. As $J^1$, a single bond, a methylene group, or a phenylene group is preferable and a single bond is particularly preferable.

$A^1$ represents a group selected from —COOH, —OH, —SH, —S(=O)$_2$R$^A$, and —S(=O)$_2$OH and $R^A$ represents an alkyl group. The preferable range of the alkyl group as $R^A$ is the same as the preferable range of the alkyl group exemplified in the section of the group Z of substituents described below. It is preferable that $A^1$ represents —COOH or —OH.

It is preferable that the polyimide compound used in the present invention has at least one structural unit selected from structural units represented by each of Formulae (V-a) to (V-n) (that is, a structural unit represented by Formula (V-a), a structural unit represented by Formula (V-b), a structural unit represented by Formula (V-c), a structural unit represented by Formula (V-d), a structural unit represented by Formula (V-e), a structural unit represented by Formula (V-f), a structural unit represented by Formula (V-g), a structural unit represented by Formula (V-h), a structural unit represented by Formula (V-i), a structural unit represented by Formula (V-j), a structural unit represented by Formula (V-k), a structural unit represented by Formula (V-l), a structural unit represented by Formula (V-m), or a structural unit represented by Formula (V-n)) as the structural unit represented by any of Formulae (V-1) to (V-4).

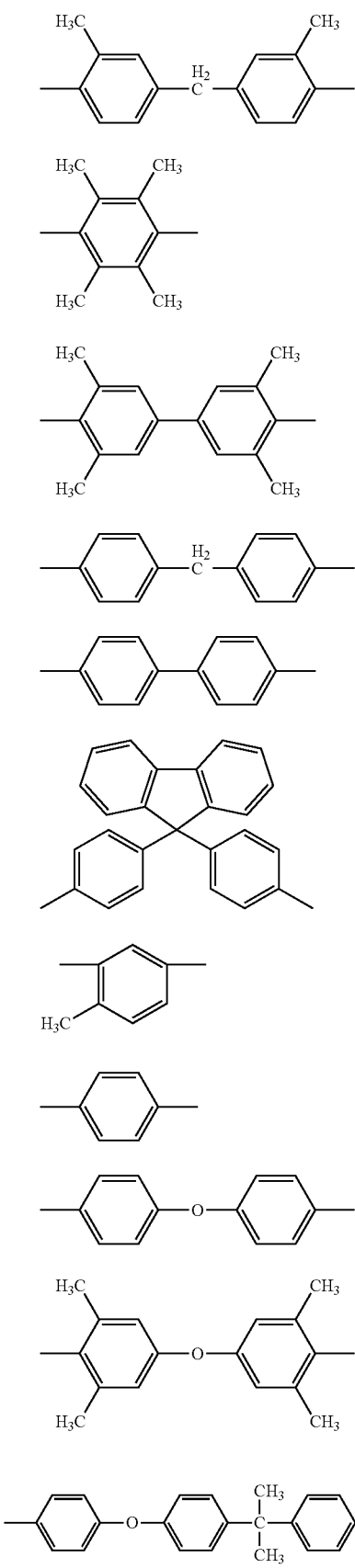

(V-a)
(V-b)
(V-c)
(V-d)
(V-e)
(V-f)
(V-g)
(V-h)
(V-i)
(V-j)
(V-k)

-continued

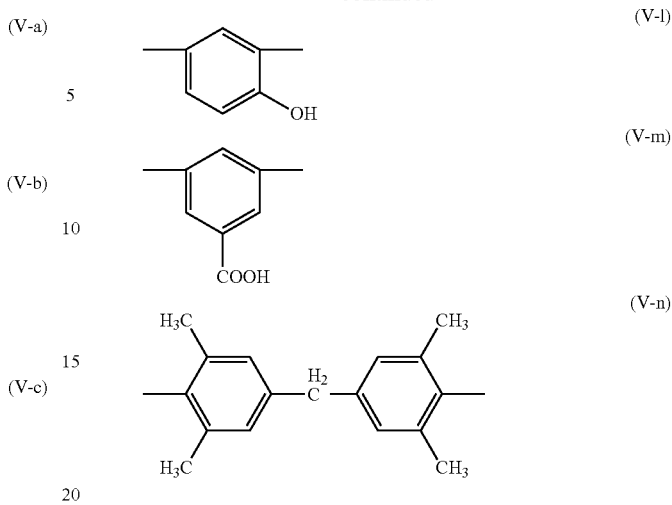

(V-l)
(V-m)
(V-n)

Among the structural units, it is preferable that the polyimide compound used in the present invention has at least one structural unit represented by any of Formulae (V-b), (V-f), (V-l), or (V-m).

In the present specification, the group Z of substituents include the following groups.

Examples of the group Z of substituents include:

an alkyl group (the number of carbon atoms of the alkyl group is preferably in a range of 1 to 30, more preferably in a range of 1 to 20, and particularly preferably in a range of 1 to 10, and examples thereof include methyl, ethyl, isopropyl, tert-butyl, n-octyl, n-decyl, and n-hexadecyl), a cycloalkyl group (the number of carbon atoms of the cycloalkyl group is preferably in a range of 3 to 30, more preferably in a range of 3 to 20, and particularly preferably in a range of 3 to 10, and examples thereof include cyclopropyl, cyclopentyl, and cyclohexyl), an alkenyl group (the number of carbon atoms of the alkenyl group is preferably in a range of 2 to 30, more preferably in a range of 2 to 20, and particularly preferably in a range of 2 to 10, and examples thereof include vinyl, allyl, 2-butenyl, and 3-pentenyl), an alkynyl group (the number of carbon atoms of the alkynyl group is preferably in a range of 2 to 30, more preferably in a range of 2 to 20, and particularly preferably in a range of 2 to 10, and examples thereof include propargyl and 3-pentynyl), an aryl group (the number of carbon atoms of the aryl group is preferably in a range of 6 to 30, more preferably in a range of 6 to 20, and particularly preferably in a range of 6 to 12, and examples thereof include phenyl, p-methylphenyl, naphthyl, and anthranyl), an amino group (such as an amino group, an alkylamino group, an arylamino group, or a heterocyclic amino group; the number of carbon atoms of the amino group is preferably in a range of 0 to 30, more preferably in a range of 0 to 20, and particularly preferably in a range of 0 to 10 and examples thereof include amino, methylamino, dimethylamino, diethylamino, dibenzylamino, diphenylamino, and ditolylamino), an alkoxy group (the number of carbon atoms of the alkoxy group is preferably in a range of 1 to 30, more preferably in a range of 1 to 20, and particularly preferably in a range of 1 to 10, and examples thereof include methoxy, ethoxy, butoxy, and 2-ethylhexyloxy), an aryloxy group (the number of carbon atoms of the aryloxy group is preferably in a range of 6 to 30, more preferably in a range of 6 to 20, and particularly preferably in a range of 6 to 12, and examples thereof include phenyloxy, 1-naphthyloxy, and 2-naphthyloxy), a heterocyclic oxy group (the number of carbon atoms of the heterocyclic oxy group is preferably in a range of 1 to 30, more preferably in a range of 1 to 20, and particularly preferably in a range of 1 to 12, and examples thereof include pyridyloxy, pyrazyloxy, pyrimidyloxy, and quinolyloxy), an acyl group (the number of carbon atoms of the acyl group is preferably in a range of 1 to 30, more preferably in a range of 1 to 20, and particularly preferably in a range of 1 to 12, and examples thereof include acetyl, benzoyl, formyl, and pivaloyl), an alkoxycarbonyl group (the number of carbon atoms of the alkoxycarbonyl group is preferably in a range of 2 to 30, more preferably in a range of 2 to 20, and particularly preferably in a range of 2 to 12, and examples thereof include methoxycarbonyl and ethoxycarbonyl), an aryloxycarbonyl group (the number of carbon atoms of the aryloxycarbonyl group is preferably in a range of 7 to 30, more preferably in a range of 7 to 20, and particularly preferably in a range of 7 to 12, and examples thereof include phenyloxycarbonyl), an acyloxy group (the number of carbon atoms of the acyloxy group is preferably in a range of 2 to 30, more preferably in a range of 2 to 20, and particularly preferably in a range of 2 to 10, and examples thereof include acetoxy and benzoyloxy), an acylamino group (the number of carbon atoms of the acylamino group is preferably in a range of 2 to 30, more preferably in a range of 2 to 20, and particularly preferably in a range of 2 to 10, and examples thereof include acetylamino and benzoylamino), an alkoxycarbonylamino group (the number of carbon atoms of the alkoxycarbonylamino group is preferably in a range of 2 to 30, more preferably in a range of 2 to 20, and particularly preferably in a range of 2 to 12, and examples thereof include methoxycarbonylamino), an aryloxycarbonylamino group (the number of carbon atoms of the aryloxycarbonylamino group is preferably in a range of 7 to 30, more preferably in a range of 7 to 20, and particularly preferably in a range of 7 to 12, and examples thereof include phenyloxycarbonylamino), a sulfonylamino group (the number of carbon atoms of the sulfonylamino group is preferably in a range of 1 to 30, more preferably in a range of 1 to 20, and particularly preferably in a range of 1 to 12, and examples thereof include methanesulfonylamino and benzenesulfonylamino), a sulfamoyl group (the number of carbon atoms of the sulfamoyl group is preferably in a range of 0 to 30, more preferably in a range of 0 to 20, and particularly preferably in a range of 0 to 12, and examples thereof include sulfamoyl, methylsulfamoyl, dimethylsulfamoyl, and phenylsulfamoyl), a carbamoyl group (the number of carbon atoms of the carbamoyl group is preferably in a range of 1 to 30, more preferably in a range of 1 to 20, and particularly preferably in a range of 1 to 12, and examples thereof include carbamoyl, methylcarbamoyl, diethylcarbamoyl, and phenylcarbamoyl), an alkylthio group (the number of carbon atoms of the alkylthio group is preferably in a range of 1 to 30, more preferably in a range of 1 to 20, and particularly preferably in a range of 1 to 12, and examples thereof include methylthio and ethylthio), an arylthio group (the number of carbon atoms of the arylthio group is preferably in a range of 6 to 30, more preferably in a range of 6 to 20, and particularly preferably in a range of 6 to 12, and examples thereof include phenylthio), a heterocyclic thio group (the number of carbon atoms of the heterocyclic thio group is preferably in a range of 1 to 30, more preferably in a range of 1 to 20, and particularly preferably in a range of 1 to 12, and examples thereof include pyridylthio, 2-benzimidazolylthio, 2-benzoxazolylthio, and 2-benzothiazolylthio), a sulfonyl group (the number of carbon atoms of the sulfonyl group is preferably in a range of 1 to 30, more preferably in a range of 1 to 20, and particularly preferably in a range of 1 to 12, and examples thereof include mesyl and tosyl), a sulfinyl group (the number of carbon atoms of the sulfinyl group is preferably in a range of 1 to 30, more preferably in a range of 1 to 20, and particularly preferably in a range of 1 to 12, and examples thereof include methanesulfinyl and benzenesulfinyl), an ureido group (the number of carbon atoms of the ureido group is preferably in a range of 1 to 30, more preferably in a range of 1 to 20, and particularly preferably in a range of 1 to 12, and examples thereof include ureido, methylureido, and phenylureido), a phosphoric acid amide group (the number of carbon atoms of the phosphoric acid amide group is preferably in a range of 1 to 30, more preferably in a range of 1 to 20, and particularly preferably in a range of 1 to 12, and examples thereof include diethyl phosphoric acid amide and phenyl phosphoric acid amide), a hydroxy group, a mercapto group, a halogen atom (such as a fluorine atom, a chlorine atom, a bromine atom, or an iodine atom, and a fluorine atom is more preferable), a cyano group, a sulfo group, a carboxyl group, an oxo group, a nitro group, a hydroxamic acid group, a sulfino group, a hydrazine group, an imino group, a heterocyclic group (a 3- to 7-membered ring heterocyclic group is preferable, the hetero ring may be aromatic or non-aromatic, examples of a heteroatom constituting the hetero ring include a nitrogen atom, an oxygen atom, and a sulfur atom, the number of carbon atoms of the heterocyclic group is preferably in a range of 0 to 30 and more preferably in a range of 1 to 12, and specific examples thereof include imidazolyl, pyridyl, quinolyl, furyl, thienyl, piperidyl, morpholino, benzoxazolyl, benzimidazolyl, benzothiazolyl, carbazolyl, and azepinyl), a silyl group (the number of carbon atoms of the silyl group is preferably in a range of 3 to 40, more preferably in a range of 3 to 30, and particularly preferably in a range of 3 to 24, and examples thereof include trimethylsilyl and triphenylsilyl), and a silyloxy group (the number of carbon atoms of the silyloxy group is preferably in a range of 3 to 40, more preferably in a range of 3 to 30, and particularly preferably in a range of 3 to 24, and examples thereof include trimethylsilyloxy and triphenylsilyloxy). These substituents may be substituted with any one or more substituents selected from the group Z of substituents.

Further, in the present invention, when a plurality of substituents are present at one structural site, these substituents may be linked to each other to form a ring or may be condensed with some or entirety of the structural site and form an aromatic ring or an unsaturated hetero ring.

When a compound or a substituent includes an alkyl group or an alkenyl group, these may be linear or branched and may be substituted or non-substituted. In addition, when a compound or a substituent includes an aryl group or a heterocyclic group, these may be a single ring or a condensed ring and may be substituted or non-substituted.

In the present specification, when a group is described as only a substituent, the group Z of substituents can be used as reference unless otherwise specified. Further, when only the names of the respective groups are described (for example, a group is described as an "alkyl group"), the preferable range and the specific examples of the corresponding group in the group Z of substituents are applied.

In the polyimide compound used in the present invention, the viscosity of a solution obtained by dissolving the polyimide compound in N-methylpyrrolidone such that the concentration of the polyimide compound is set to 5% by mass is in a range of 2.2 to 22.0 mPa·sec. When the polyimide compound has such physical properties, the strength of the gas separation membrane is increased and a uniform compact layer is formed, and thus both of separation selectivity and permeability can be obtained.

In a case where the viscosity of the solution is less than 2.2 mPa·sec, polyimide molecular chains are not entangled much during the formation of a membrane, the strength of a compact layer is decreased so that film defects easily occur, impurities such as toluene are easily dissolved, and the impurity resistance (plasticization resistance) is also degraded.

Further, in a case where the viscosity of the solution is greater than 22.0 mPa·sec, film thickness irregularity easily occurs and film defects also easily occur.

In the polyimide compound used in the present invention, the viscosity of the solution obtained by dissolving the polyimide compound in N-methylpyrrolidone such that the concentration of the polyimide compound is set to 5% by mass is preferably in a range of 2.5 to 20.0 mPa·sec and more preferably in a range of 3.0 to 15.0 mPa·sec.

In the present invention, the viscosity is a value obtained by measuring the viscosity at 25° C. and 60 rpm for a measurement time of 60 seconds using a vibration type viscometer (product name: VM-10A-L, manufactured by Sekonic Holdings Corp.).

Even when the polyimide compound is already used for film formation, it is possible to confirm whether the physical property value of the viscosity of the polyimide compound constituting the membrane is in the range defined in the present invention by immersing the membrane in N-methylpyrrolidone to extract the polyimide compound and concentrating or diluting the extraction liquid such that the concentration thereof is set to 5% by mass.

In the polyimide compound used in the present invention, it is preferable that a total molar amount a of the structural unit represented by Formula (I) to a total molar amount c of the structural unit represented by Formula (IV) in the structure thereof satisfies an inequation of $0.2 \leq a/c$. When the total molar amount a to the total molar amount c satisfies the inequation of $0.2 \leq a/c$, the polarity of polyimide is increased and the separation selectivity of the gas separation membrane can be increased. Further, in a case of UV irradiation, a crosslinking reaction tends to easily proceed and the film hardness or impurity resistance can be improved. The ratio of a to c is preferably 0.3 or greater and more preferably 0.5 or greater.

In the polyimide compound used in the present invention, it is preferable that a total molar amount b of the structural units represented by each of Formulae (II) and (III) to a total molar amount d of the structural units represented by each of Formulae (V-a) to (V-m) in the structure thereof satisfies an inequation of $0.1 \leq b/d \leq 20.0$. When the inequation of $0.1 \leq b/d \leq 20.0$ is satisfied, the free volume fraction of polyimide increases so that the gas permeability of the gas separation membrane can be improved.

In the polyimide compound used in the present invention, it is preferable that a molar amount b1 of the structural unit represented by Formula (II) satisfies an inequation of $b1/d \leq 0.9$. Since excessive introduction of the structural unit represented by Formula (II) adversely affects the film hardness or the impurity resistance, it is preferable to attempt improvement of gas permeability by introducing a moderate amount of the structural unit.

It is preferable that the glass transition temperature of the polyimide compound used in the present invention is higher than 200° C. When the glass transition temperature is higher than 200° C., the mobility of polyimide decreases so that the separation selectivity of the gas separation membrane can be improved. Further, the film hardness or the impurity resistance can be improved. The glass transition temperature of the polyimide compound is preferably higher than 250° C. and more preferably 300° C.

In the present invention, the glass transition temperature is measured using a differential scanning calorimeter (DSC). More specifically, the temperature corresponding to an intersection between the baseline and the gradient of a rising portion during an endothermic process accompanied by glass transition when the measurement is carried out at a temperature rising rate of 10° C./min from room temperature using a differential scanning calorimeter (DSC) is set to the glass transition temperature.

Even when the polyimide compound is already used for film formation, it is possible to confirm whether the polyimide compound constituting a membrane satisfies the above-described conditions for the glass transition temperature by measuring the glass transition temperature using a sample obtained by immersing the membrane in N-methylpyrrolidone, extracting the polyimide compound, and drying the extraction liquid.

The polyimide compound used in the present invention may have structural units (other structural units) other than the structural units represented by Formulae (I), (II), (III), (IV), and (V-1) to (V-4) in the structure thereof. The ratio of a total molar amount e of other structural units in the polyimide compound to a total molar amount f of the structural units represented by Formulae (I), (II), (III), (IV), and (V-1) to (V-4) is preferably in a range of 0:100 to 20:80 and more preferably in a range of 0:100 to 10:90.

The weight-average molecular weight of the polyimide compound used in the present invention is preferably in a range of 10,000 to 1,000,000, more preferably in a range of 15,000 to 500,000, and still more preferably in a range of 20,000 to 200,000.

The molecular weight and the dispersity in the present specification are set to values measured using a gel permeation chromatography (GPC) method unless otherwise specified and the molecular weight is set to a weight-average molecular weight in terms of polystyrene. A gel including an aromatic compound as a repeating unit is preferable as a gel filling a column used for the GPC method and examples of the gel include a gel formed of a styrene-divinylbenzene copolymer. It is preferable that two to six columns are connected to each other and used. Examples of a solvent to be used include an ether-based solvent such as tetrahydrofuran and an amide-based solvent such as N-methylpyrrolidinone. It is preferable that measurement is performed at a flow rate of the solvent of 0.1 to 2 mL/min and most preferable that the measurement is performed at a flow rate thereof of 0.5 to 1.5 mL/min. When the measurement is performed in the above-described range, a load is not applied to the apparatus and the measurement can be more efficiently performed. The measurement temperature is preferably in a range of 10° C. to 50° C. and most preferably in a range of 20° C. to 40° C. In addition, the column and the carrier to be used can be appropriately selected according to the physical properties of a polymer compound which is a target for measurement.

(Synthesis of Polyimide Compound)

The polyimide compound used in the present invention can be synthesized by performing condensation and polymerization of a specific bifunctional acid anhydride (tetracarboxylic dianhydride) and a specific diamine. Such methods are described in, for example, "The Latest Polyimide~Fundamentals and Applications~" edited by Toshio Imai and Rikio Yokota, NTS Inc., Aug. 25, 2010, pp. 3 to 49 and a method for synthesizing a polyimide compound to be used in the present invention can be suitably selected.

For example, in the synthesis of the polyimide compound used in the present invention, the structural unit represented by Formula (I) and the structural unit represented by Formula (IV) are respectively formed by a condensation polymerization reaction of a tetracarboxylic dianhydride represented by Formula (VI), a tetracarboxylic dianhydride represented by Formula (VII), and a diamine compound.

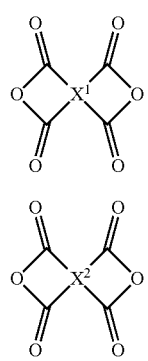

Formula (VI)

Formula (VII)

In Formulae (VI) and (VII), $X^1$ and $X^2$ have the same definitions as those for $X^1$ and $X^2$ described in Formulae (I) and (IV).

Further, in the synthesis of the polyimide compound used in the present invention, the structural unit represented by Formula (II) and the structural unit represented by Formula (III) are respectively formed by a condensation polymerization reaction of a diamine compound represented by Formula (VIII), a diamine compound represented by Formula (IX), and a tetracarboxylic dianhydride.

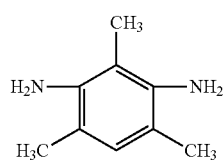

Formula (VIII)

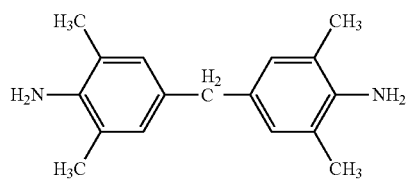

Formula (IX)

The structural units represented by each of Formulae (V-1) to (V-4) are formed by a condensation polymerization reaction of a diamine compound having the corresponding structure and a tetracarboxylic dianhydride similar to the structural units described above.

The solvent used for synthesis of the polyimide compound used in the present invention is not particularly limited, and examples thereof include an ester-based organic solvent such as methyl acetate, ethyl acetate, or butyl acetate; an aliphatic ketone-based organic solvent such as acetone, methyl ethyl ketone, methyl isobutyl ketone, diacetone alcohol, cyclopentanone, or cyclohexanone; an ether-based organic solvent such as ethylene glycol dimethyl ether, dibutyl butyl ether, tetrahydrofuran, methyl cyclopentyl ether, or dioxane; an amide-based organic solvent such as N-methylpyrrolidone, 2-pyrrolidone, dimethylformamide, dimethylimidazolidinone, or dimethylacetamide; and a sulfur-containing organic solvent such as dimethyl sulfoxide or sulfolane. These organic solvents can be suitably selected within the range in which a tetracarboxylic dianhydride serving as a reaction substrate, a diamine compound, polyamic acid which is a reaction intermediate, and a polyimide compound which is a final product can be dissolved. Among these, an ester-based organic solvent (preferably butyl acetate), an aliphatic ketone organic solvent (preferably methyl ethyl ketone, methyl isobutyl ketone, diacetone alcohol, cyclopentanone, or cyclohexanone), an ether-based organic solvent (diethylene glycol monomethyl ether or methyl cyclopentyl ether), an amide-based organic solvent (preferably N-methylpyrrolidone), or a sulfur-containing organic solvent (dimethyl sulfoxide or sulfolane) is preferable. In addition, these can be used alone or in combination of two or more kinds thereof.

The temperature of the condensation polymerization reaction is not particularly limited and a temperature which can be usually employed for the synthesis of the polyimide compound can be employed. Specifically, the temperature is preferably in a range of −40° C. to 60° C. and more preferably in a range of −30° C. to 50° C.

The polyimide compound can be obtained by imidizing the polyamic acid, which is generated by the above-described polymerization reaction, through a dehydration ring-closure reaction in a molecule. A thermal imidization method of performing heating in a temperature range 120° C. to 200° C. and removing water generated as a by-product to the outside the system for a reaction or a so-called chemical imidization method in which a dehydrating condensation agent such as an acetic anhydride, dicyclohexylcarbodiimide, or triphenyl phosphite is used in the coexistence of a basic catalyst such as pyridine, trimethylamine, or diazabicycloundecene (DBU) can be employed.

The total concentration of the tetracarboxylic dianhydride and the diamine compound in the reaction solution of the condensation polymerization reaction is not particularly limited, but is preferably in a range of 5% to 70% by mass, more preferably in a range of 5% to 50% by mass, and still more preferably in a range of 5% to 30% by mass.

[Gas Separation Asymmetric Membrane]

Figure 2:
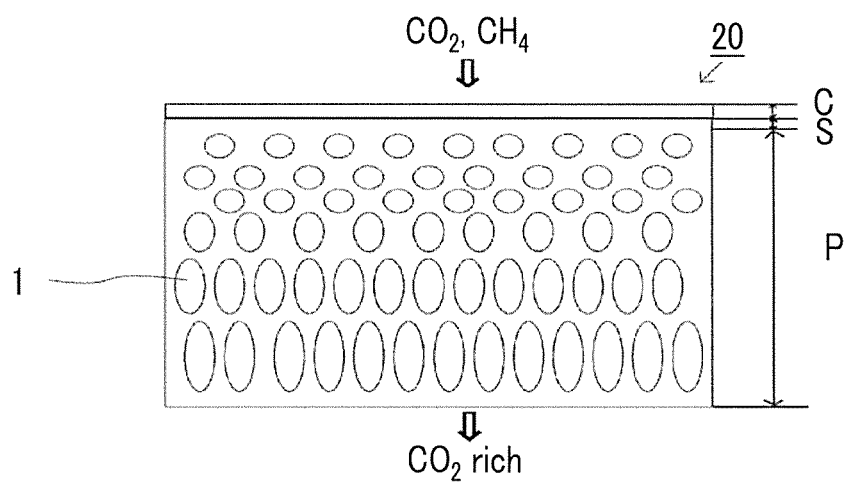
FIG. 2 is a view schematically illustrating another embodiment of a gas separation asymmetric membrane of the present invention.

The gas separation membrane of the present invention is in the form of an asymmetric membrane. FIG. 1 is a schematic view illustrating a preferable form of the gas separation asymmetric membrane of the present invention. This gas separation asymmetric membrane 10 is formed such that a thin compact layer (S, hereinafter, also referred to as a "skin layer" or a "gas separation layer") contributing to gas separation is formed on a side to which gas is supplied, a portion other than the compact layer is a thick porous layer (P), and this porous layer functions as a support. The compact layer (S) in the present invention indicates a gas separation layer having "gas separation capability" and it is preferable that the compact layer does not have a through-hole with a size of 1 nm or greater. In addition, the porous layer (P) has a hole 1 penetrating from the terminal on the upper side (surface in contact with the compact layer S) to the terminal on the lower side and does not have gas separation capability like the compact layer (S). FIG. 2 is a schematic view illustrating another preferable form of the gas separation asymmetric membrane of the present invention. The gas separation asymmetric membrane illustrated in FIG. 2 is formed such that a siloxane compound layer (C, hereinafter, also referred to as a "protective layer") is provided on the compact layer (gas separation layer) of the gas separation asymmetric membrane illustrated in FIG. 1.

The "gas permeability" in the present invention means that the permeation rate of carbon dioxide is $1 \times 10^{-5}$ cm$^3$(STP)/cm$^2$·sec·cmHg (10 GPU) or greater when carbon dioxide is supplied by setting the temperature to 40° C. and the total pressure on the side to which gas is supplied to 4 MPa, and is preferably 20 GPU or greater, more preferably 50 GPU or greater, and still more preferably 100 GPU or greater. Further, the "gas separation capability" means film performance in which the permeability of a specific gas becomes higher than the permeability of other gases when mixed gas formed of two or more kinds of gases is supplied, and $R_{CO_2}/R_{CH_4}$ described below is preferably 20 or greater.

In the present specification, in regard to the expressions related to up and down, the side in which gas to be separated is supplied to is set as "up" and the side in which the separated gas is discharged is set as "down" unless otherwise specified.

The gas separation membrane of the present invention can be formed by a phase inversion method using a solution (dope solution) containing the above-described polyimide compound. The phase inversion method is a known method of allowing a dope solution to be brought into contact with a coagulating liquid for phase inversion to form a membrane, and a so-called dry-wet method is suitably used in the present invention. The dry-wet method is a method of forming a porous layer by evaporating a solution on the surface of a dope solution which is made to have a membrane shape, immersing the resultant in a coagulating liquid (a solvent which is compatible with a solvent of a dope solution and in which a polyimide compound in a dope solution is insoluble) to form a compact layer, and forming fine pores using a phase separation phenomenon that occurs at this time, and this method is suggested by Loeb and Sourirajan (for example, the specification of U.S. Pat. No. 3,133,132A).

The solvent is volatilized from the surface of the coating solution and the moisture in air is absorbed by performing the process of evaporating the solution on the surface of the dope solution. In this manner, the surface enters a state of being easily solidified so that the film thickness of the compact layer (skin layer) to be formed can be stabilized when the coagulating liquid is brought into contact with the surface thereof.

Since a medium used for preparation of the dope solution is phase-converted, it is preferable that the medium is a solvent mixed with the coagulating liquid. As the solvent of the dope solution, at least an aprotic polar organic solvent selected from N-methylpyrrolidone, N-ethylpyrrolidone, γ-butyrolactone, dimethyl sulfoxide, dimethylacetamide, dimethylformamide, methylene chloride, tetrahydrofuran, dioxane, and 1,3-dioxolane is more preferably used. It is also preferable that solvents such as ketone, alcohol, acetonitrile, and water are mixed with these solvents and can be used as a medium of the dope solution.

Further, it is preferable that the coagulating liquid is formed of a mixed solution of water and a protonic polar solvent (preferably alcohol).

A porous support can be coated with the above-described dope solution. Examples of such a support include gas permeating porous membranes such as a nanofiltration membrane, an ultrafiltration membrane, a microfiltration membrane, woven fabric, and non-woven fabric. Among these, non-woven fabric is preferable. As the non-woven fabric, fibers formed of polyester, polypropylene, polyacrylonitrile, polyethylene, and polyamide may be used alone or in combination of plural kinds thereof. The non-woven fabric can be produced by papermaking main fibers and binder fibers which are uniformly dispersed in water using a circular net or a long net and then drying the fibers with a drier. Moreover, for the purpose of removing a nap or improving mechanical properties, it is preferable that thermal pressing processing is performed on the non-woven fabric by interposing the non-woven fabric between two rolls.

In a case where a porous membrane such as non-woven fabric is coated with a dope solution, a part of the dope solution permeates into voids of the porous membrane and a phase separation phenomenon occurs in this state. Accordingly, the gas separation asymmetric membrane to be obtained is formed by being integrated with the porous membrane such as non-woven fabric. That is, it is also preferable that a porous layer includes a porous support and fine holes formed by curing a dope solution containing a polyimide compound.

The film thickness of the gas separation asymmetric membrane of the present invention is preferably in a range of 10 μm to 200 μm (in a case where the gas separation asymmetric membrane is supported by a porous membrane such as non-woven fabric, the film thickness includes the thickness of the porous membrane). Further, the thickness of the surface layer (in other words, the gas separation layer) contributing to gas separation which is referred to as a compact layer or a skin layer is not particularly limited, but is preferably in a range of 0.01 to 5.0 μm, more preferably in a range of 0.05 to 2.0 μm, and still more preferably in a range of 0.05 to 1.0 μm from the viewpoint of imparting practical gas permeability.

The gas separation asymmetric membrane of the present invention may be a flat membrane or a hollow fiber membrane. An asymmetric hollow fiber membrane can be produced by a dry-wet spinning method. The dry-wet spinning method is a method of producing an asymmetric hollow fiber membrane by applying a dry-wet method to a dope solution which is discharged from a spinning nozzle in a hollow fiber shape. More specifically, the dry-wet spinning method is a method in which a dope solution is discharged from a nozzle in a hollow fiber shape and passes through air or a nitrogen gas atmosphere immediately after the discharge. A polyimide compound is not substantially dissolved and is immersed in a coagulating liquid which is compatible with a solvent of the dope solution to form an asymmetric structure. Thereafter, the obtained membrane is dried and subjected to a heat treatment as necessary, thereby producing a gas separation asymmetric membrane.

It is preferable that the solution viscosity of a dope solution discharged from a nozzle is in a range of 2 Pa·s to 1700 Pa·s, preferably 10 Pa·s to 1500 Pa·s, and particularly preferably in a range of 20 Pa·s to 1000 Pa·s at the discharge temperature (for example, 10° C.) from a viewpoint of stably obtaining the shape after the discharge such as a hollow fiber shape or the like. It is preferable that immersion of a membrane in a coagulating liquid is carried out by immersing the membrane in a primary coagulating liquid to be solidified to the extent that the shape of a membrane such as a hollow fiber shape can be maintained, winding the membrane around a guide roll, immersing the membrane in a secondary coagulating liquid, and sufficiently solidifying the whole membrane. It is effective that the solidified membrane is dried after the coagulating liquid is substituted with a solvent such as hydrocarbon.

In the gas separation membrane of the present invention, the content of the polyimide compound in the compact layer is not particularly limited as long as desired gas separation performance can be obtained. From the viewpoint of further improving gas separation performance, the content of the polyimide compound in the gas separation layer is preferably 20% by mass or greater, more preferably 40% by mass or greater, still more preferably 60% by mass or greater, and even still more preferably 70% by mass or greater. Further, the content of the polyimide compound in the gas separation layer may be 100% by mass, but is typically 99% by mass or less.

The gas separation asymmetric membrane formed in the above-described manner can be cured as necessary. The polyimide compound used for forming the gas separation membrane of the present invention contains a group which is capable of forming a crosslinked structure using a radical such as —C(=O)— or —SO$_2$—. Therefore, a polyimide compound can be cured through UV irradiation, a heat treatment, or the like.

The proportion of an insoluble component in the compact layer is adjusted by this curing reaction to be preferably in a range of 1 to 20% by mass, more preferably in a range of 3% to 15% by mass, and still more preferably in a range of 5% to 10% by mass. The content of the insoluble component in the compact layer is measured by a method described in the examples below.

The content of the organic solvent contained in the gas separation membrane of the present invention is preferably in a range of 10 to 5000 ppm by mass. When the gas separation layer contains the above-described specific amount of organic solvent, the flexibility of the gas separation membrane is increased so that the film forming properties and the strength can be improved.

The content of the organic solvent in the gas separation membrane of the present invention is preferably in a range of 50 to 2000 ppm by mass, more preferably in a range of 100 to 1000 ppm by mass, and still more preferably in a range of 200 to 700 ppm by mass. The content of the organic solvent is measured by a method described in the examples below.

The organic solvent contained in the gas separation layer is an organic solvent used for preparation of the above-described dope solution and is not particularly limited. As the organic solvent, an aprotic organic solvent is preferable and an aprotic polar organic solvent is more preferable. As the organic solvent contained in the gas separation layer, organic solvents selected from methyl ethyl ketone, methyl isobutyl ketone, N-methylpyrrolidone, N-ethylpyrrolidone, γ-butyrolactone, dimethyl sulfoxide, dimethylacetamide, dimethylformamide, methylene chloride, tetrahydrofuran, dioxane, and 1,3-dioxolane are preferable and organic solvents selected from methyl ethyl ketone, N-methylpyrrolidone, methyl chloride, tetrahydrofuran, and 1,3-dioxolane are more preferable. Since each of these organic solvents has a relatively high boiling point, the organic solvents can be present in the gas separation layer in a relatively stabilized manner.

It is preferable that the gas separation membrane of the present invention is formed using a polymer obtained by blending the above-described polyimide compound and polymers other than the polyimide compound (hereinafter, also referred to as "other polymers"). The gas separation membrane in this form is also included in the range of the "gas separation asymmetric membrane formed using a polyimide compound" of the present invention. As the polymers other than the polyimide compound, one or two or more polymers selected from polyacrylonitrile, polystyrene, polyethersulfone, polytetrafluoroethylene, cellulose acetate, polyether ether ketone, polyamide, polysulfone, sulfonated polysulfone, sulfonated polyethersulfone, and polyvinylpyrrolidone may be exemplified. Among these, from the viewpoint of increasing the strength of the gas separation membrane, it is preferable that the gas separation membrane is formed using a polymer obtained by blending the above-described polyimide compound and polyethersulfone.

In a case where the gas separation membrane is formed using the above-described blended polymer, the content of other polymers in the blended polymer is preferably in a range of 2% to 40% by mass and more preferably in a range of 10% to 30% by mass.

[Siloxane Compound Layer]

In the gas separation membrane of the present invention, it is also preferable that the siloxane compound layer is provided on the compact layer in a state of being brought into contact with the compact layer. It is preferable that the siloxane compound layer is an organopolysiloxane compound layer. In addition, the Si ratio of the siloxane compound layer before and after being immersed in chloroform represented by Equation (I) is in a range of 0.6 to 1.0.

Si ratio=(Si—Kα X-ray intensity after immersion in chloroform)/(Si—Kα X-ray intensity before immersion in chloroform)　　　Equation (I)

The Si ratio is calculated by immersing the siloxane compound layer in chloroform at 25° C. for 12 hours, irradiating the surface of the siloxane compound layer with X-rays before and after the immersion, and measuring the intensity of a peak (2θ=144.6 deg) of the Si—Kα X-ray (1.74 keV). The method of measuring the Si—Kα X-ray intensity is described in JP1994-88792A (JP-H06-88792A). In a case where the Si—Kα X-ray intensity is decreased due to the immersion of the siloxane compound layer in chloroform compared to the Si—Kα X-ray intensity before the immersion, this means that low-molecular weight components are present and these low-molecular weight components are eluted. Therefore, this means that a polymer constituting the siloxane compound layer is more polymerized and thus unlikely to be eluted in chloroform as the degree of a decrease in Si—Kα X-ray intensity is smaller after the immersion of the siloxane compound layer in chloroform.

When the Si ratio of the siloxane compound layer is in a range of 0.6 to 1.0, the siloxane compound can be allowed to be homogeneously present in the layer with a high density, film defects can be effectively prevented, and the gas separation performance can be more improved. Further, the gas separation layer can be used under conditions of a high temperature, a high pressure, and a high humidity and the plasticization of the gas separation layer due to the impurity components such as toluene can be suppressed.

The Si ratio of the siloxane compound layer in the present invention is preferably in a range of 0.7 to 1.0, more preferably in a range of 0.75 to 1.0, still more preferably in a range of 0.8 to 1.0, and even still more preferably in a range of 0.85 to 1.0.

It is preferable that the siloxane compound layer of the present invention contains an organopolysiloxane compound having a structure formed by siloxane compounds being linked to each other through a linking group selected from *—O-M-O—*, *—S-M-S—*, *—NR$^a$C(=O)—*, *—NR$^b$C(=O)NR$^b$—*, *—O—CH$_2$—O—*, *—S—CH$_2$CH$_2$—*, *—OC(=O)O—*, *—CH(OH)CH$_2$OCO—*, *—CH(OH)CH$_2$O—*, *—CH(OH)CH$_2$S—*, *—CH(OH)CH$_2$NR$^c$—*, *—CH(CH$_2$OH)CH$_2$OCO—*, *—CH(CH$_2$OH)CH$_2$O—*, *—CH(CH$_2$OH)CH$_2$S—*, *—CH(CH$_2$OH)CH$_2$N(R$^c$)$_2$—*, *—CH$_2$CH$_2$—*, *—C(=O)O$^-$N$^+$(R$^d$)$_3$—*, *—SO$_3^-$N$^+$(R$^e$)$_3$—*, and *—PO$_3$H$^-$N$^+$(R$^f$)$_3$—*.

In the formulae, M represents a divalent to tetravalent metal atom. R$^a$, R$^b$, R$^c$, R$^d$, R$^e$, and R$^f$ each independently represent a hydrogen atom or an alkyl group. The symbol * represents a linking site.

As the metal atom M, metal atoms selected from aluminum (Al), iron (Fe), beryllium (Be), gallium (Ga), vanadium (V), indium (In), titanium (Ti), zirconium (Zr), copper (Cu), cobalt (Co), nickel (Ni), Zn (zinc), calcium (Ca), magnesium (Mg), yttrium (Y), scandium (Sc), chromium (Cr), manganese (Mn), molybdenum (Mo), and boron (B) may be exemplified. Among these, metal atoms selected from Zr, Fe, Zn, Al, Ga, Ti, In, and B are preferable, metal atoms selected from Al, Ti, In, and B are more preferable, and Al is still more preferable.

The number of carbon atoms of the alkyl group as R$^a$, R$^b$, R$^c$, R$^d$, R$^e$, and R$^f$ is preferably in a range of 1 to 20, more preferably in a range of 1 to 10, still more preferably in a range of 1 to 7, and even still more preferably in a range of 1 to 4. The alkyl group may be linear or branched, but is more preferably linear. Specific preferred examples of the alkyl group include alkyl groups exemplified in the section of the group Z of substituents described above.

When the siloxane compound layer has the structure in which siloxane compounds are linked to each other through the linking group, the Si ratio of the siloxane compound layer is easily increased so as to be in the range defined by the present invention.

The reaction of linking the siloxane compounds to each other through the linking group is described below.

<*—O-M-O—*>

The linking group *—O-M-O—* can be formed by a ligand exchange reaction between a siloxane compound having a —OH group (active hydrogen-containing group) such as a hydroxy group, a carboxy group, or a sulfo group and a metal complex (crosslinking agent) represented by Formula (B).

$$M{-}(L)_q \quad (B)$$

In the formula, M has the same definition as that for the metal atom M and the preferable form thereof is the same as that of the metal atom M. L represents an alkoxy group, an aryloxy group, an acetylacetonate group, an acyloxy group, a hydroxy group, or a halogen atom. q represents an integer of 2 to 4.

The number of carbon atoms of the alkoxy group as L is preferably in a range of 1 to 10, more preferably in a range of 1 to 4, and still more preferably in a range of 1 to 3. Specific examples of the alkoxy group as L include methoxy, ethoxy, tert-butoxy, and isopropoxy.

The number of carbon atoms of the aryloxy group as L is preferably in a range of 6 to 10, more preferably in a range of 6 to 8, and still more preferably 6 to 7. Specific examples of the aryloxy group as L include phenoxy, 4-methoxyphenoxy, and naphthoxy.

The number of carbon atoms of the acyloxy group as L is preferably in a range of 2 to 10, more preferably in a range of 2 to 6, and still more preferably in a range of 2 to 4. Specific examples of the acyloxy group as L include acetoxy, propanoyloxy, pivaloyloxy, and benzoyloxy.

The halogen atom as L is not particularly limited and examples thereof include a fluorine atom, a chlorine atom, a bromine atom, and an iodine atom. Among these, a chlorine atom is preferable.

It is preferable that the metal complex represented by Formula (B) is soluble in the organic solvent used for the coating solution when the siloxane compound layer is formed. More specifically, the solubility of the metal complex represented by Formula (B) in 100 g of tetrahydrofuran at 25° C. is preferably 0.1 g or greater and more preferably 1.0 g or greater. When the metal complex represented by Formula (B) is soluble in the organic solvent, a more homogeneous metal crosslinked siloxane compound layer can be formed.

Preferred specific examples of the metal complex represented by Formula (B) include metal complexes selected from aluminum acetylacetonate, gallium acetylacetonate, indium acetylacetonate, zirconium acetylacetonate, cobalt acetylacetonate, calcium acetylacetonate, nickel acetylacetonate, zinc acetylacetonate, magnesium acetylacetonate, ferric chloride, copper (II) acetate, aluminum isopropoxide, titanium isopropoxide, and boric acid.

An example of the ligand exchange reaction is shown as follows. Further, the following example shows a case where a siloxane compound contains a hydroxy group, but the same ligand exchange reaction proceeds and a linking group represented by *—O-M-O—* is formed in a case where a siloxane compound contains an active hydrogen-containing group such as a carboxy group or a sulfo group.

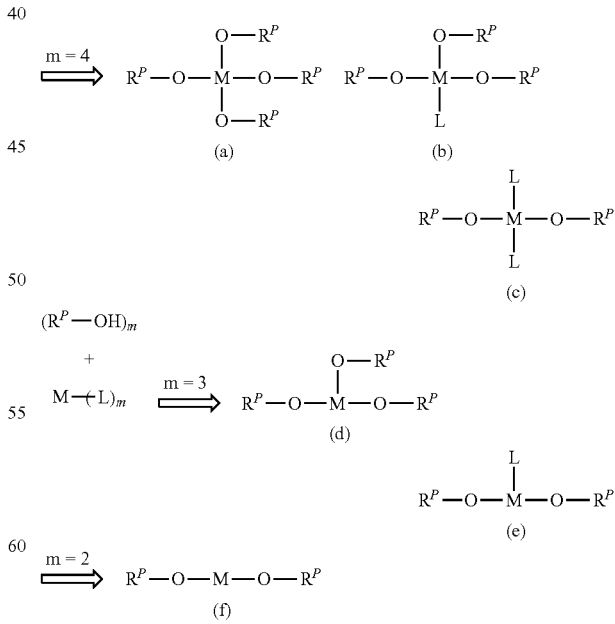

In the formulae, R$^P$ represents a siloxane compound residue (that is, R$^P$—OH represents a siloxane compound having a hydroxy group).

In a case where M represents a tetravalent metal atom (m=4), up to 4 ($R^P$—OH)'s can be usually coordinated with respect to one M (the form of (a) shown above). In the present invention, in a case where M represents a tetravalent metal atom, all of a form in which 2 ($R^P$—OH)'s are coordinated (the form of (c) shown above), a form in which 3 ($R^P$—OH)'s are coordinated (the form of (b) shown above), and a form in which 4 ($R^P$—OH)'s are coordinated (the form of (a) shown above) are set to be included in the form having a linking group represented by *—O-M-O—*.

Further, although not shown in the formulae above, in a case where the siloxane compound $R^P$—OH is represented by $R^{P1}$—$(OH)_h$ (in a case where $R^{P1}$ represents a siloxane compound residue and h represents an integer of 2 or greater, that is, two or more hydroxy groups are included in one molecule), two or more OH's which are present in one molecule of $R^{P1}$—$(OH)_h$ may be coordinated with one M. This form is also set to be included in the form having a linking group represented by *—O-M-O—*.

In a case where M represents a trivalent metal atom (m=3), up to 3 ($R^P$—OH)'s can be usually coordinated with respect to one M (the form of (d) shown above). In the present invention, in a case where M represents a trivalent metal atom, all of a form in which 2 ($R^P$—OH)'s are coordinated (the form of (e) shown above) and a form in which 3 ($R^P$—OH)'s are coordinated (the form of (d) shown above) are set to be included in the form having a linking group represented by *—O-M-O—*.

Further, although not shown in the formulae above, in a case where the siloxane compound $R^P$—OH is represented by $R^{P1}$—$(OH)_h$ (in a case where $R^{P1}$ represents a siloxane compound residue and h represents an integer of 2 or greater, that is, two or more hydroxy groups are included in one molecule), two or more OH's which are present in one molecule of $R^{P1}$—$(OH)_h$ may be coordinated with one M. This form is also set to be included in the form having a linking group represented by *—O-M-O—*.

In a case where M represents a divalent metal atom (m=2), the form of (f) shown above is the form having a linking group represented by *—O-M-O—* which is defined by the present invention.

Further, although not shown in the formulae above, in a case where the siloxane compound $R^P$—OH is represented by $R^{P1}$—$(OH)_h$ (in a case where $R^{P1}$ represents a siloxane compound residue and h represents an integer of 2 or greater, that is, two or more hydroxy groups are included in one molecule), two or more OH's which are present in one molecule of $R^{P1}$—$(OH)_h$ may be coordinated with one M. This form is also set to be included in the form having a linking group represented by *—O-M-O—*.

<*—S-M-S—*>

The linked structure *—S-M-S—* can be formed by a ligand exchange reaction between a siloxane compound having a thiol group and a metal complex represented by Formula (B). This reaction is obtained by replacing $R^P$—OH with $R^P$—SH in the reaction for forming *—O-M-O—* described above. Since —SH is an active hydrogen-containing group, a ligand exchange reaction can be performed as described above.

<*—$NR^aC$(=O)—*>

The linking group *—$NR^aC$(=O)—* can be formed by reacting a siloxane compound containing a carboxy group with a siloxane compound containing an amino group in the presence of a dehydration condensation agent (for example, a carbodiimide compound). This reaction can be represented by the following formula.

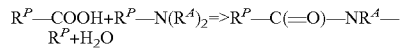

In the formula, $R^P$ represents a siloxane compound residue. One of two $R^A$'s linked to one N on the left side represents a hydrogen atom and the rest represents a hydrogen atom or an alkyl group (that is, $R^A$ on the right side represents a hydrogen atom or an alkyl group).

Further, the linking group can be formed by reacting a siloxane compound containing a carboxy group with a compound containing two or more amino groups serving as a crosslinking agent. Further, the linking group can be formed even by reacting a siloxane compound containing an amino group with a compound containing two or more carboxy groups serving as a crosslinking agent.

<*—$NR^bC$(=O)$NR^b$—*>

The linking group *—$NR^bC$(=O)$NR^b$—* can be formed by reacting, for example, a siloxane compound containing an amino group with chloroformate serving as a crosslinking agent. The reaction can be represented by the following formula.

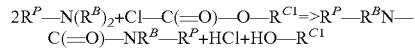

In the formula, $R^P$ represents a siloxane compound residue and $R^{C1}$ represents an alcohol residue of chloroformate. One of two $R^B$'s linked to one N on the left side represents a hydrogen atom and the rest represents a hydrogen atom or an alkyl group (that is, $R^B$ on the right side represents a hydrogen atom or an alkyl group).

<*—O—$CH_2$—O—*>

The linking group *—O—$CH_2$—O—* can be formed by reacting, for example, a siloxane compound containing a hydroxy group with formaldehyde serving as a crosslinking agent. The reaction can be represented by the following formula.

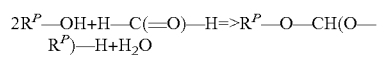

In the formula, $R^P$ represents a siloxane compound residue.

<*—S—$CH_2CH_2$—*>

The linking group *—S—$CH_2CH_2$—* can be formed by reacting, for example, a siloxane compound containing a thiol group with a siloxane compound containing a vinyl group. The reaction can be represented by the following formula.

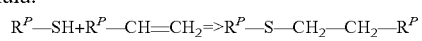

In the formula, $R^P$ represents a siloxane compound residue.

Further, the linking group can be formed even by reacting a siloxane compound containing a thiol group with a compound containing two or more vinyl groups serving as a crosslinking agent. Further, the linking group can be formed even by reacting a siloxane compound containing a vinyl group with a compound containing two or more thiol groups serving as a crosslinking agent.

<*—OC(=O)O—*>

The linking group *—OC(=O)O—* can be formed by reacting, for example, a siloxane compound containing a hydroxy group with chloroformate serving as a crosslinking agent. The reaction can be represented by the following formula.

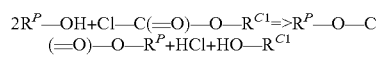

In the formula, $R^P$ represents a siloxane compound residue and $R^{C1}$ represents an alcohol residue of chloroformate.

<*—C(=O)O⁻N⁺(Rᵈ)₃—*>

The linking group *—C(=O)O⁻N⁺(Rᵈ)₃—* can be formed by reacting, for example, a siloxane compound containing a carboxy group with a siloxane compound containing an amino group. The reaction can be represented by the following formula.

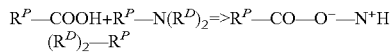

In the formula, R^P represents a siloxane compound residue. R^D represents a hydrogen atom or an alkyl group.

Further, the linking group can be formed even by reacting a siloxane compound containing a carboxy group with a compound containing two or more amino groups serving as a crosslinking agent. Further, the linking group can be formed even by reacting a siloxane compound containing an amino group with a compound containing two or more carboxy groups serving as a crosslinking agent.

<*—SO₃⁻N⁺(Rᵉ)₃—*>

The linking group *—SO₃⁻N⁺(Rᵉ)₃—* can be formed by reacting, for example, a siloxane compound containing a sulfo group with a siloxane compound containing an amino group. The reaction can be represented by the following formula.

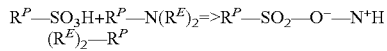

In the formula, R^P represents a siloxane compound residue. R^E represents a hydrogen atom or an alkyl group.

Further, the linking group can be formed even by reacting a siloxane compound containing a sulfo group with a compound containing two or more amino groups serving as a crosslinking agent. Further, the linking group can be formed even by reacting a siloxane compound containing an amino group with a compound containing two or more sulfo groups serving as a crosslinking agent.

<*—PO₃H⁻N⁺(R^f)₃—*>

The linking group *—PO₃H⁻N⁺(R^f)₃—* can be formed by reacting, for example, a cellulose resin containing a phosphonic acid group with a siloxane compound containing an amino group. The reaction can be represented by the following formula.

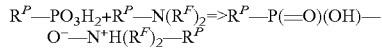

In the formula, R^P represents a siloxane compound residue. R^F represents a hydrogen atom or an alkyl group.

Further, the linking group can be formed even by reacting a siloxane compound containing a phosphonic acid group with a compound containing two or more amino groups serving as a crosslinking agent. Further, the linking group can be formed even by reacting a siloxane compound containing an amino group with a compound containing two or more phosphonic acid groups serving as a crosslinking agent.

<*—CH(OH)CH₂OCO—*>

The linking group *—CH(OH)CH₂OCO—* can be formed by reacting, for example, a siloxane compound containing an epoxy group with a siloxane compound containing a carboxy group.

Further, the linking group can be formed even by reacting a siloxane compound containing an epoxy group with a compound containing two or more carboxy groups serving as a crosslinking agent or by reacting a siloxane compound containing a carboxy group with a compound containing two or more epoxy groups serving as a crosslinking agent.

<*—CH(OH)CH₂O—*>

The linking group *—CH(OH)CH₂O—* can be formed by reacting, for example, a siloxane compound containing an epoxy group with a siloxane compound containing a hydroxy group.

Further, the linking group can be formed even by reacting a siloxane compound containing an epoxy group with a compound containing two or more hydroxy groups serving as a crosslinking agent or by reacting a siloxane compound containing a hydroxy group with a compound containing two or more epoxy groups serving as a crosslinking agent.

<*—CH(OH)CH₂S—*>

The linking group *—CH(OH)CH₂S—* can be formed by reacting, for example, a siloxane compound containing an epoxy group with a siloxane compound containing a thiol group.

Further, the linking group can be formed even by reacting a siloxane compound containing an epoxy group with a compound containing two or more thiol groups serving as a crosslinking agent or by reacting a siloxane compound containing a thiol group with a compound containing two or more epoxy groups serving as a crosslinking agent.

<*—CH(OH)CH₂NR^c—*>

The linking group *—CH(OH)CH₂NR^c—* can be formed by reacting, for example, a siloxane compound containing an epoxy group with a siloxane compound containing an amino group.

Further, the linking group can be formed even by reacting a siloxane compound containing an epoxy group with a compound containing two or more amino groups serving as a crosslinking agent or by reacting a siloxane compound containing an amino group with a compound containing two or more epoxy groups serving as a crosslinking agent.

<*—CH(CH₂OH)CH₂OCO—*>

The linking group *—CH(CH₂OH)CH₂OCO—* can be formed by replacing an epoxy group with an oxetanyl group in the formation of *—CH(OH)CH₂OCO—* described above.

<*—CH(CH₂OH)CH₂O—*>

The linking group *—CH(CH₂OH)CH₂O—* can be formed by replacing an epoxy group with an oxetanyl group in the formation of *—CH(OH)CH₂O—* described above.

<*—CH(CH₂OH)CH₂S—*>

The linking group *—CH(CH₂OH)CH₂S—* can be formed by replacing an epoxy group with an oxetanyl group in the formation of *—CH(OH)CH₂S—* described above.

<*—CH(CH₂OH)CH₂NR^c—*>

The linking group *—CH(CH₂OH)CH₂NR^c—* can be formed by replacing an epoxy group with an oxetanyl group in the formation of *—CH(OH)CH₂NR^c—* described above.

<*—CH₂CH₂—*>

The linking group *—CH₂CH₂—* can be formed by, for example, performing a polymerization reaction on siloxane compounds containing a vinyl group (a (meth)acryloyl group or the like).

In the present invention, structures linked through *—CH₂CH₂—* do not include structures linked through *—S—CH₂CH₂—*.

The siloxane compound layer may include one or two or more linked structures.

As the linked structure of siloxane compounds in the siloxane compound layer of the present invention, from the viewpoints of the gas separation performance and film hardness of the separation membrane, one or two or more linked structures linked through a linking group selected from *—O-M-O—*, *—S-M-S—*, *—O—CH₂—O—*, *—S—CH₂CH₂—*, *—OC(=O)O—*, *—CH₂CH₂—*, and *—C(=O)O⁻N⁺(R$^d$)$_3$—* are preferable, one or two or more linked structures linked through a linking group selected from *—O-M-O—*, *—S-M-S—*, *—O—CH$_2$—O—*, *—S—CH$_2$CH$_2$—*, and —CH$_2$CH$_2$—* are more preferable, one or two linked structures linked through a linking group selected from *—O-M-O—* and *—CH$_2$CH$_2$—* are still more preferable, and linked structures consisting of both of a linked structure linked through *—O-M-O—* and a linked structure linked through *—CH$_2$CH$_2$—* are even still more preferable.

The siloxane compound (the siloxane compound before a linked structure is formed through the linking group) that is used as a raw material of the siloxane compound layer is not particularly limited as long as the siloxane compound has a functional group imparting the linked structure. Preferred examples of this polysiloxane compound include one or two or more compounds selected from methacrylate-modified polydialkylsiloxane, methacrylate-modified polydiarylsiloxane, methacrylate-modified polyalkylarylsiloxane, thiol-modified polydialkylsiloxane, thiol-modified polydiarylsiloxane, thiol-modified polyalkylarylsiloxane, hydroxy-modified polydialkylsiloxane, hydroxy-modified polydiarylsiloxane, hydroxy-modified polyalkylarylsiloxane, amine-modified polydialkylsiloxane, amine-modified polydiarylsiloxane, amine-modified polyalkylarylsiloxane, vinyl-modified polydialkylsiloxane, vinyl-modified polydiarylsiloxane, vinyl-modified polyalkylarylsiloxane, carboxy-modified polydialkylsiloxane, carboxy-modified polydiarylsiloxane, carboxy-modified polyalkylarylsiloxane, hydrosilyl-modified polydialkylsiloxane, hydrosilyl-modified polydiarylsiloxane, hydrosilyl-modified polyalkylarylsiloxane, epoxy-modified polydialkylsiloxane, epoxy-modified polydiarylsiloxane, epoxy-modified polyalkylarylsiloxane, oxetanyl-modified polydialkylsiloxane, oxetanyl-modified polydiarylsiloxane, and oxetanyl-modified polyalkylarylsiloxane.

Further, in the polysiloxane compound exemplified above, the modified site due to each functional group may be a terminal or a side chain. In addition, it is preferable that two or more modified sites are present in one molecule. Further, each functional group introduced due to the modification may further include a substituent.

The ratio between the amount of the alkyl group and the amount of the aryl group in the above-described "polyalkylarylsiloxane" is not particularly limited. In other words, the structure of the "polyalkylarylsiloxane" may have a dialkylsiloxane structure or a diarylsiloxane structure.

In the siloxane compound exemplified above, the number of carbon atoms of the alkyl group is preferably in a range of 1 to 10, more preferably in a range of 1 to 5, still more preferably in a range of 1 to 3, and even still more preferably methyl. Further, in the siloxane compound exemplified above, the number of carbon atoms of the aryl group is preferably in a range of 6 to 20, more preferably in a range of 6 to 15, still more preferably in a range of 6 to 12, and even still more preferably phenyl.

It is preferable that the siloxane compound layer of the present invention has at least one structure selected from (i) or (ii) described below.

(i) A structure which has a structure represented by Formula (1) and a structure represented by Formula (2) or (3)

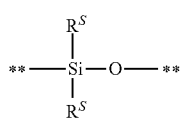

Formula (1)

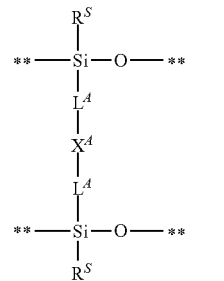

Formula (2)

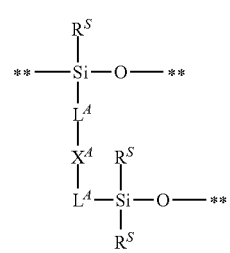

Formula (3)

(ii) A structure represented by Formula (4)

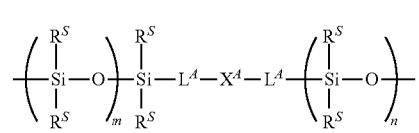

Formula (4)

In the formulae, R$^S$ represents an alkyl group or an aryl group. L$^A$ represents a single bond or a divalent linking group. X$^A$ represents a linking group selected from *—O-M$^1$-O—*, *—S-M$^1$-S—*, *—O—CH$_2$—O—*, *—S—CH$_2$CH$_2$—*, *—OC(=O)O—*, *—CH$_2$CH$_2$—*, and *—C(=O)O⁻N⁺(R$^d$)$_3$—*. M$^1$ represents Zr, Fe, Zn, B, Al, or Ga, R$^d$ represents a hydrogen atom or an alkyl group. m and n represent an integer of 2 or greater (preferably an integer of 5 or greater). The symbol * represents a linking site. The symbol  represents a linking site in a siloxane bond (that is, in Formulae (1) to (3), the symbol  represents a linking site with respect to a Si atom in a case where an O atom is present to the next to the symbol  and the symbol  represents a linking site with respect to an O atom in a case where a Si atom is present to the next to the symbol **).

In addition, it is preferable that the terminal structure of Formula (4) is a group selected from a hydrogen atom, a mercapto group, an amino group, a vinyl group, a carboxy group, an oxetane group, a sulfonic acid group, and a phosphonic acid group.

In a case where R$^S$ represents an alkyl group, the number of carbon atoms thereof is preferably in a range of 1 to 10, more preferably in a range of 1 to 5, and still more preferably in a range of 1 to 3, and methyl is particularly preferable.

In a case where R$^S$ represents an aryl group, the number of carbon atoms thereof is preferably in a range of 6 to 20, more preferably in a range of 6 to 15, and still more preferably in a range of 6 to 12, and a phenyl group is even still more preferable.

In a case where L$^A$ represents a divalent linking group, an alkylene group (an alkylene group having preferably 1 to 10 carbon atoms and more preferably 1 to 5 carbon atoms), an arylene group (an arylene group having 6 to 20 carbon atoms and more preferably 6 to 15 carbon atoms, and still more preferably a phenylene group), or —Si($R^S$)$_2$—O— is preferable (R has the same definition as that for $R^S$ of Formula (2) and the preferable form thereof is the same as that of $R^S$, and "O" in —Si($R^S$)$_2$—O— is linked to Si shown in the formula above).

It is preferable that the structure of (i) described above has a repeating unit represented by Formula (5) in addition to the structure represented by any of Formulae (1) to (3).

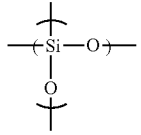

Formula (5)

It is also preferable that the repeating unit represented by Formula (5) has a structure in which repeating units represented by Formula (5) are linked to each other through a siloxane bond in the siloxane compound layer.

In the siloxane compound layer of the present invention, the content of the repeating unit represented by Formula (5) is preferably in a range of 0.01 to 0.55, more preferably in a range of 0.03 to 0.40, and still more preferably in a range of 0.05 to 0.25.

The content of the repeating unit represented by Formula (5) is measured by a method described in the examples below.

In the present invention, the thickness of the siloxane compound layer is preferably in a range of 10 to 3000 nm and more preferably in a range of 100 to 1500 nm.

[Use and Characteristics of Gas Separation Membrane]

The gas separation membrane (the composite membrane and the asymmetric membrane) of the present invention can be suitably used according to a gas separation recovery method and a gas separation purification method. For example, a gas separation membrane which is capable of efficiently separating specific gas from a gas mixture containing gas, for example, hydrocarbon such as hydrogen, helium, carbon monoxide, carbon dioxide, hydrogen sulfide, oxygen, nitrogen, ammonia, a sulfur oxide, a nitrogen oxide, methane, or ethane; unsaturated hydrocarbon such as propylene; or a perfluoro compound such as tetrafluoroethane can be obtained. Particularly, it is preferable that a gas separation membrane selectively separating carbon dioxide from a gas mixture containing carbon dioxide and hydrocarbon (methane) is obtained.

In addition, in a case where gas subjected to a separation treatment is mixed gas of carbon dioxide and methane, the permeation rate of the carbon dioxide at 40° C. and 5 MPa is preferably greater than 20 GPU, more preferably greater than 30 GPU, and still more preferably in a range of 50 GPU to 500 GPU. The ratio between permeation rates of carbon dioxide and methane ($R_{CO2}/R_{CH4}$, hereinafter, also referred to as "separation selectivity") is preferably 15 or greater, more preferably 20 or greater, still more preferably 23 or greater, and particularly preferably in a range of 25 to 50. $R_{CO2}$ represents the permeation rate of carbon dioxide and $R_{CH4}$ represents the permeation rate of methane.

Further, 1 GPU is $1 \times 10^{-6}$ cm$^3$ (STP)/cm$^2$·cm·sec·cmHg.

[Other Components and the Like]

A non-ionic surfactant, a cationic surfactant, or an organic fluoro compound can be added to the gas separation membrane of the present invention in order to adjust liquid properties of the dope solution.

Specific examples of the surfactant include anionic surfactants such as alkyl benzene sulfonate, alkyl naphthalene sulfonate, higher fatty acid salts, sulfonate of higher fatty ester, sulfuric ester salts of higher alcohol ether, sulfonate of higher alcohol ether, alkyl carboxylate of higher alkyl sulfonamide, and alkyl phosphate; non-ionic surfactants such as polyoxyethylene alkyl ether, polyoxyethylene alkyl phenyl ether, polyoxyethylene fatty acid ester, sorbitan fatty acid ester, an ethylene oxide adduct of acetylene glycol, an ethylene oxide adduct of glycerin, and polyoxyethylene sorbitan fatty acid ester; and amphoteric surfactants such as alkyl betaine and amide betaine; a silicon-based surfactant; and a fluorine-based surfactant, and the surfactant can be suitably selected from known surfactants and derivatives thereof in the related art.

Further, a polymer dispersant may be included, and specific examples of the polymer dispersant include polyvinyl pyrrolidone, polyvinyl alcohol, polyvinyl methyl ether, polyethylene oxide, polyethylene glycol, polypropylene glycol, and polyacrylamide. Among these, polyvinyl pyrrolidone is preferably used.

The conditions of forming the gas separation membrane of the present invention are not particularly limited. The temperature thereof is preferably in a range of −30° C. to 100° C., more preferably in a range of −10° C. to 80° C., and particularly preferably in a range of 5° C. to 50° C.

In the present invention, when a membrane is formed, gas such as air or oxygen may be allowed to coexist. It is desired that the membrane is formed under an inert gas atmosphere.

[Method of Separating Gas Mixture]

The gas separation method of the present invention is a method that includes a process of selectively permeating and separating specific gas from mixed gas containing two or more gases using the gas separation membrane of the present invention. Further, it is preferable that the gas separation method of the present invention is a method that includes a process of selectively permeating carbon dioxide from mixed gas containing carbon dioxide and methane. The gas pressure at the time of gas separation is preferably in a range of 0.5 MPa to 10 MPa, more preferably in a range of 1 MPa to 10 MPa, and still more preferably in a range of 2 MPa to 7 MPa.

Further, the temperature of gas at the time of performing the gas separation method of the present invention is preferably in a range of −30° C. to 90° C. and more preferably in a range of 15° C. to 70° C. In the mixed gas containing carbon dioxide and methane gas, the mixing ratio of carbon dioxide to methane gas is not particularly limited. The mixing ratio thereof (carbon dioxide:methane gas) is preferably in a range of 1:99 to 99:1 (volume ratio) and more preferably in a range of 5:95 to 90:10.

[Gas Separation Module and Gas Separation Device]

A gas separation module can be prepared using the gas separation membrane of the present invention. Examples of the module include a spiral type module, a hollow fiber type module, a pleated module, a tubular module, and a plate & frame type module.

Moreover, when the gas separation membrane or the gas separation module of the present invention is used, it is possible to obtain a gas separation device having means for performing separation and recovery of gas or performing separation and purification of gas. The gas separation membrane of the present invention may be applied to a gas separation and recovery apparatus which is used together with an absorption liquid described in JP2007-297605A according to a membrane/absorption hybrid method.

EXAMPLES

Hereinafter, the present invention will be described in detail with reference to examples, but the present invention is not limited to these examples.

Synthesis Example

<Synthesis of Polyimide Compound P-101>

422 mL of N-methylpyrrolidone, 9.01 g (0.06 mol) of 2,4,6-trimethyl-m-phenylenediamine (manufactured by Tokyo Chemical Industry Co., Ltd., product number: T1275), and 35.61 g (0.14 mol) of N,N,N',N'-tetramethyl-4,4'-methylenedianiline (manufactured by JUNSEI CHEMICAL CO., LTD., product number: 48215-0410) were added to a 1 L three-neck flask, stirred, and completely dissolved therein in a nitrogen stream. Next, under an ice-cooling condition, 35.82 g (0.1 mol) of a 3,3'4,4'-diphenylsulfone tetracarboxylic dianhydride (manufactured by Tokyo Chemical Industry Co., Ltd., product number: D2309) and 32.22 g (0.1 mol) of a 3,3',4,4'-benzophenone tetracarboxylic dianhydride (manufactured by Tokyo Chemical Industry Co., Ltd., product number: B0948) were added to the three-neck flask for 30 minutes in a state of maintaining the temperature of the three-neck flask to 10° C. or lower. After the reaction solution was stirred at 40° C. for 2.5 hours, 67.38 g of acetic anhydride and 4.75 g of pyridine were added to the reaction solution, and the solution was further stirred at 80° C. for 3 hours. Subsequently, 673.8 mL of acetone was added to the reaction solution so that the solution was diluted. An acetone diluent of the reaction solution was added dropwise to a solution obtained by adding 1.15 L of methanol and 230 mL of acetone to a 5 L stainless steel container and stirring the mixture. The deposited polymer was suctioned and filtered and then blast-dried at 60° C., thereby obtaining 63.5 g of a polyimide compound P-101 (hereinafter, also simply referred to as a "P-101"). The structure of the polyimide compound P-101 is shown below.

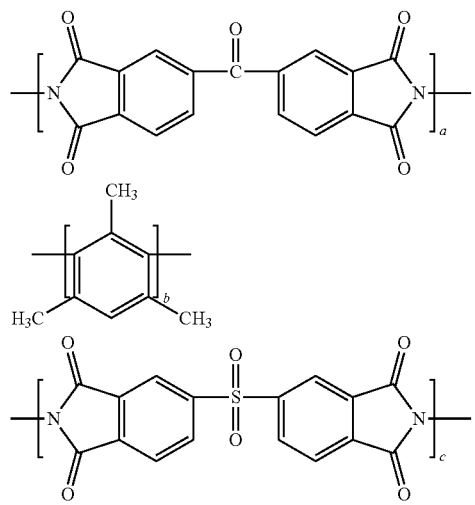

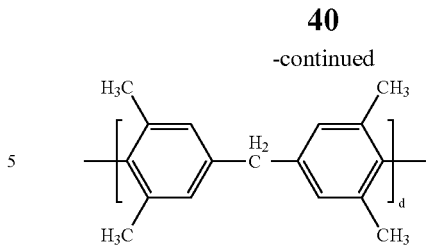

a, b, c, and d represent the molar ratio of each structural unit present in the polyimide compound. In P-101 synthesized in the above-described manner, a:b:c:d is 50:30:50:70.

Further, polyimide compounds (referred to as a polyimide compound "P-10G", a polyimide compound "P-101a", and a polyimide compound "P-101b", and G represents an integer (rank suffix) of 2 or greater) were synthesized in the same manner as the synthesis of P-101 except that the amounts of a diamine and a tetracarboxylic dianhydride to be used, which were the same as the diamine and the tetracarboxylic dianhydride used as raw materials, were changed in the synthesis of P-101 described above. The molar ratios of the constituent components of the obtained polyimide compounds are listed in the following table.

<Synthesis of Polyimide Compounds P-201 to P-701>

Polyimide compounds P-201 to P-701 were obtained according to the method of synthesizing the polyimide compound P-101. The structures of the polyimide compounds P-201 to P-701 are shown below.

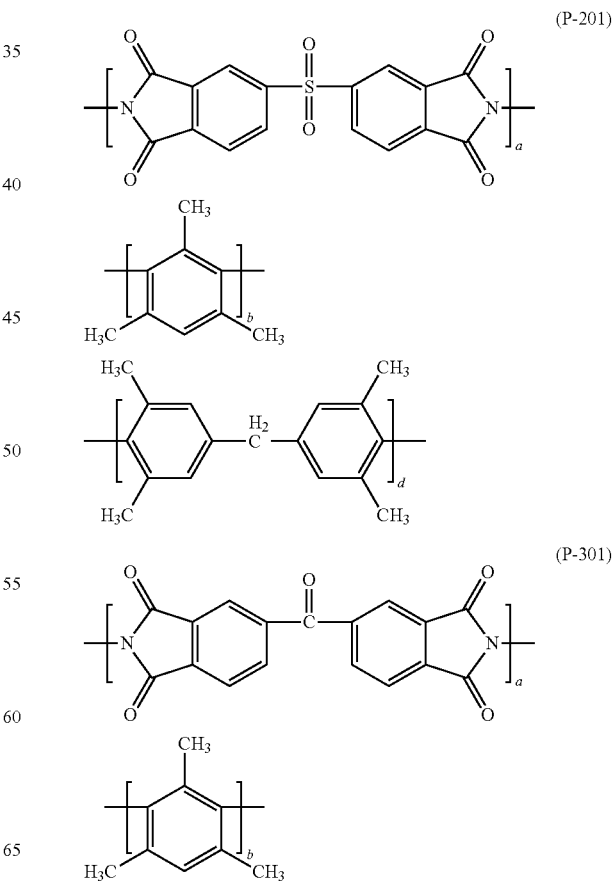

-continued

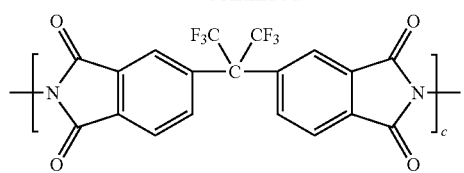

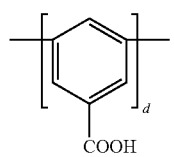

(P-401)

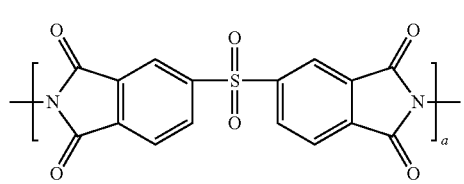

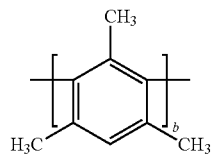

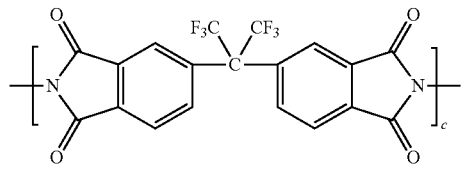

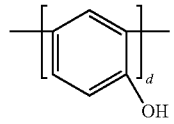

(P-501)

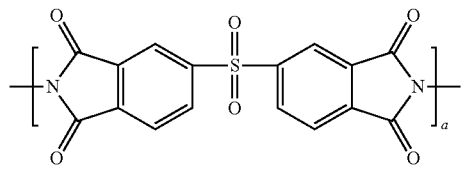

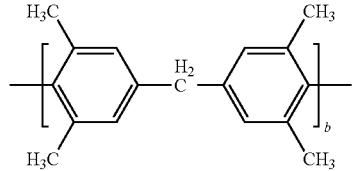

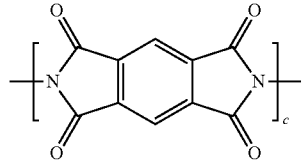

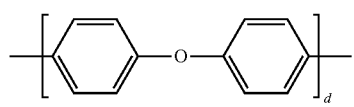

-continued (P-601)

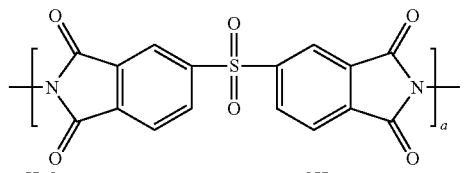

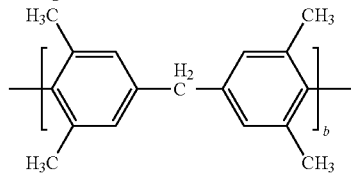

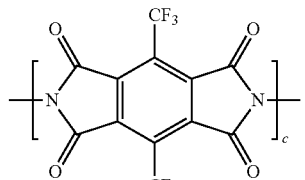

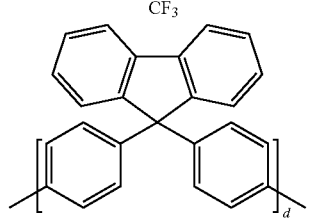

(P-701)

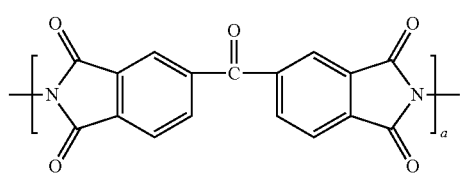

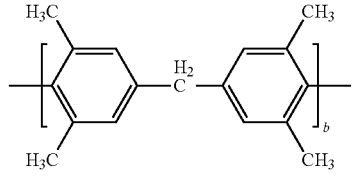

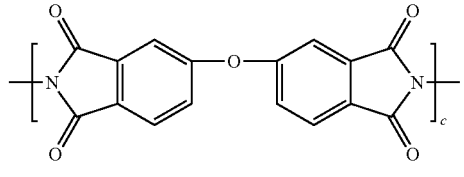

Further, a polyimide compound (referred to as a polyimide compound "P-20G", and G represents an integer (rank suffix) of 2 or greater) was synthesized in the same manner as the synthesis of P-201 except that the amounts of a diamine and a tetracarboxylic dianhydride to be used, which were the same as the diamine and the tetracarboxylic dianhydride used as raw materials, were changed in the synthesis of P-201 described above.

Further, polyimide compounds (referred to as a polyimide compound "P-30G", a polyimide compound "P-301c", and a polyimide compound "P-301d", and G represents an integer (rank suffix) of 2 or greater) were synthesized in the same manner as the synthesis of P-301 except that the amounts of a diamine and a tetracarboxylic dianhydride to be used, which were the same as the diamine and the tetracarboxylic dianhydride used as raw materials, were changed in the synthesis of P-301 described above. The molar ratios of the structural units of the obtained polyimide compounds are listed in the following table.

Further, a polyimide compound (referred to as a polyimide compound "P-40G", and G represents an integer (rank suffix) of 2 or greater) was synthesized in the same manner as the synthesis of P-401 except that the amounts of a diamine and a tetracarboxylic dianhydride to be used, which were the same as the diamine and the tetracarboxylic dianhydride used as raw materials, were changed in the synthesis of P-401 described above. The molar ratio of the structural units of the obtained polyimide compound is listed in the following table.

Further, polyimide compounds (referred to as a polyimide compound "P-50G", a polyimide compound "P-501e", and a polyimide compound "P-501f", and G represents an integer (rank suffix) of 2 or greater) were synthesized in the same manner as the synthesis of P-501 except that the amounts of a diamine and a tetracarboxylic dianhydride to be used, which were the same as the diamine and the tetracarboxylic dianhydride used as raw materials, were changed in the synthesis of P-501 described above. The molar ratios of the structural units of the obtained polyimide compounds are listed in the following table.

Further, a polyimide compound (referred to as a polyimide compound "P-60N", and N represents an integer (rank suffix) of 2 or greater) was synthesized in the same manner as the synthesis of P-601 except that the amounts of a diamine and a tetracarboxylic dianhydride to be used, which were the same as the diamine and the tetracarboxylic dianhydride used as raw materials, were changed in the synthesis of P-601 described above. The molar ratio of the structural units of the obtained polyimide compound is listed in the following table.

Further, a polyimide compound (referred to as a polyimide compound "P-70N", and N represents an integer (rank suffix) of 2 or greater) was synthesized in the same manner as the synthesis of P-701 except that the amounts of a diamine and a tetracarboxylic dianhydride to be used, which were the same as the diamine and the tetracarboxylic dianhydride used as raw materials, were changed in the synthesis of P-701 described above. The molar ratio of the structural units of the obtained polyimide compound is listed in the following table.

Moreover, the weight-average molecular weights of the polyimide compounds synthesized in the examples or comparative examples were in a range of 100000 to 150000.

EXAMPLE AND COMPARATIVE EXAMPLE

<Preparation of Gas Separation Asymmetric Membrane (Flat Membrane (FS-101))>

A dope solution was prepared by mixing P-101 (10.0 g), polyethersulfone (2.5 g), N-methylpyrrolidone (NMP, 23.5 g), 1,3-dioxolane (52.1 g), acetone (4.09 g), and methanol (2.79 g) and degassing the mixture. Non-woven fabric made of polyester (manufactured by AWA PAPER MFG. CO., LTD., film thickness of 95 μm) was placed on a clean glass plate (length of 10 cm×width of 10 cm×thickness of 3 mm, the same applies to hereinafter), and the dope solution was cast thereon. Thereafter, the glass plate was immersed in a water bath at 0° C. for 5 minutes, the dope solution was gelled, the water temperature in the water bath was set to 88° C., and the dope solution was annealed for 10 minutes. Thereafter, the annealed dope solution was dried at 80° C. for 5 hours, irradiated with UV light at an illuminance of 1.5 J/cm², and cured, thereby obtaining a gas separation asymmetric membrane. In the obtained gas separation asymmetric membrane, the thickness of the compact layer (gas separation layer) was 140 nm and the total thickness of the film including non-woven fabric was 100 μm.

(Formation of Protective Layer)

A composition for forming a siloxane compound layer was prepared by mixing 10 g of a vinyl Q resin (manufactured by Gelest Inc., product number: VQM-135), 1 g of hydrosilyl PDMS (manufactured by Gelest Inc., product number: HMS-301), 5 mg of a Karstedt catalyst (manufactured by Sigma-Aldrich Co., LLC., product number of 479527), and 90 g of heptane. Next, the compact layer of the gas separation asymmetric membrane obtained in the above-described manner was spin-coated with the composition for forming a siloxane compound layer. Thereafter, the composition for forming a siloxane compound layer was dried at 80° C. for 5 hours and cured. In this manner, a gas separation asymmetric membrane FS-101 including a siloxane compound layer (a protective layer was formed thereon) on the compact layer of the asymmetric membrane was obtained.

<Preparation of Gas Separation Asymmetric Membrane (Hollow Fiber Membrane (HF-101))>

A dope solution was prepared by mixing P-101 (10.0 g), polyethersulfone (3.18 g), NMP (23.5 g), 1,3-dioxolane (52.1 g), acetone (4.09 g), and isopropanol (3.04 g) and degassing the mixture. The dope solution was discharged from an outer tube of a cylindrical double-tube type spinning nozzle (inner tube diameter of 0.35 mm, outer tube diameter of 1.0 mm) under conditions of 50° C. at 2.25 mL/min and pure water was discharged at a flow rate of 1.25 mL/min from an inner tube simultaneously with the discharge of the dope solution. The discharged dope solution was exposed to the air at room temperature and at a humidity of 25% for 2 seconds and immersed in pure water at 20° C., thereby preparing hollow fibers having an asymmetric structure. Next, after the hollow fibers were annealed for 30 minutes at a hot water bath at 70° C., the annealed hollow fibers were washed with water and methanol respectively once. Thereafter, the washed hollow fibers were blast-dried at 100° C. for 5 hours, and the outer surface of the hollow fibers was irradiated with UV light at an illuminance of 1.5 J/cm² and then cured, thereby obtaining a gas separation asymmetric membrane. In the obtained gas separation asymmetric membrane, the thickness of the compact layer (gas separation layer) was 110 nm.

(Formation of Protective Layer)

The outer surface of the hollow fibers was dip-coated with the composition for forming a siloxane compound layer, dried at 80° C. for 5 hours, and then cured. In this manner, a gas separation asymmetric membrane HF-101 on which a hollow-fiber protective layer was obtained.

In the preparation of the flat membrane (FS-101) or the preparation of the hollow fiber membrane (HF-101), the used polyimide compound P-101 was changed to each polyimide compound synthesized in the above-described synthesis example, and NMP used for the dope solution was changed to N-ethylpyrrolidone (NEP) or dimethyl sulfoxide (DMSO) as appropriate, thereby preparing each gas separation asymmetric membrane (the flat membrane (FS) and the hollow fiber membrane (HF)) listed in the following table. During the preparation of the gas separation asymmetric membrane FS-105, the irradiation with UV light was not performed.

[Test Example 1] Measurement of Organic Solvent Content in Gas Separation Membrane The gas separation asymmetric membranes prepared according to the methods described in each of the examples and comparative examples were cut out, immersed in 30 mL of a solvent (extractant), which was different from a solvent (solvent to be detected and used for preparing a dope solution or a solvent to be detected and used for forming a protective layer) to be detected and was capable of extracting the solvent to be detected, for 24 hours, the solvent to be detected was extracted, and this extraction liquid was set as a sample for measuring the content of an organic solvent to be detected. The content of the organic solvent to be detected (ppm, on a mass basis), which was present in the gas separation layer was measured using this sample according to headspace GC. The conditions for measurement were as follows.

Here, in each of the examples and the comparative examples, NMP, NEP, DMSO, 1,3-dioxolane, acetone, methanol, and isopropanol were used for preparing a dope solution. Further, heptane was used for forming a protective layer. Tetrahydrofuran was used as an extractant in a case where NMP, NEP, and DMSO were used as targets to be detected and dichloromethane was used as an extractant in a case where 1,3-dioxolane, acetone, methanol, isopropanol, and heptane were used as targets to be detected.

—Conditions for Measurement—
Vial holding temperature: 80° C.
Vial holding time: 30 minutes
Injection volume: 0.8 mL
Column: PEG-1500 20% on Shimalite (2.6 mm×3 m)
Column temperature: 80° C.
Inlet temperature: 150° C.
Detection temperature: 150° C.
Column flow rate: N2 50 mL/min
Detector: FID
Sample amount: flat membrane of 1 cm×1 cm square, hollow fiber membrane having a length of 30 cm As the organic solvents detected by the above-described measurement, NMP, NEP, and DMSO used for preparing a dope solution were only detected as listed in the following table.

Test Example 2

Measurement of Insolubilization Ratio 0.2 g of a portion other than the protective layer and the non-woven fabric in each of the gas separation asymmetric membranes prepared according to the methods described in each of the examples and comparative examples was immersed in 500 g of NMP for 12 hours. Thereafter, the insoluble component was taken out by filtration under reduced pressure and dried in a vacuum at 100° C. The insolubilization ratio was calculated using the following equation based on the mass of the insoluble component which had been immersed and dried.

Insolubilization ratio (% by mass)=100×[mass of insoluble component [g]/0.2]

Since the portions other than the protective layer and the non-woven fabric in the gas separation asymmetric membrane are formed of the same material, the insolubilization ratio is the content (% by mass) of the insoluble component in the compact layer.

[Test Example 3] Measurement of Si Ratio

Each gas separation asymmetric membrane (flat membranes) on which the protective layer of each of the examples and the comparative examples was formed was cut out to have a size of 3 cm$^2$ and immersed in 500 g of chloroform at 25° C. for 12 hours. Thereafter, the intensity of the peak (2θ=144.6 deg) of the Si—Kα ray of the fluorescent X-ray was measured by taking out the gas separation asymmetric membrane, drying the membrane in a vacuum, and irradiating the surface of the membrane with X-rays (fluorescent X-ray analysis method, device: XRF-1700 manufactured by Shimadzu Corporation). Similarly, the intensity of the peak of the Si—Kα ray of the fluorescent X-ray was measured by irradiating the surface of the membrane with X-rays even before the taken-out gas separation asymmetric membrane was immersed in chloroform. The obtained values of the intensity of the Si—Kα X-ray before and after the immersion of the gas separation asymmetric membrane in chloroform were applied to Equation (I) and the Si ratio was calculated.

Further, a tube was allowed to spread out on the plane in the hollow fiber membrane and adhered onto an aluminum plate having a size of 3 cm$^2$ without any space, and the Si ratio was measured according to the same method as that for the flat membrane.

[Test Example 4] Measurement of Content of Repeating Unit Represented by Formula (5)

Each gas separation asymmetric membrane (flat membrane) prepared in each of the examples and the comparative examples was cut out to have a size of 2.5 cm$^2$ and set as a sample for measurement. The Si2P (around 98 to 104 eV) of this sample for measurement was measured under conditions of Al—Kα rays (1490 eV 25 W, 100 umφ) as an X-ray source, a measurement region of 300 μm×300 μm, Pass Energy 55 eV, and Step 0.05 eV using X-ray photoelectron spectroscopy (device: Quantra SXM, manufactured by Ulvac-PHI, Inc.), separating and quantifying the peaks of the T component (103 eV) and the Q component (104 eV), and comparing the results. In other words, "[SA]/([SA]+[ST])" was calculated based on the total value [ST] of the fluorescent X-ray intensity [SA] of the Si—O bond energy peak of the repeating unit (Q component) represented by Formula (5) and the intensity of the Si—O bond energy peak of the structure (T component) other than the repeating unit represented by Formula (5) and the result was set as the content of the repeating unit represented by Formula (5).

Further, a tube was allowed to spread out on the plane in the hollow fiber membrane and adhered onto an aluminum plate having a size of 2.5 cm$^2$ without any space by setting the side of the compact layer as the upper surface, and the content of the repeating unit represented by Formula (5) was measured according to the same method as that for the flat membrane.

[Test Example 5] Evaluation of Film Forming Properties

According to the methods described in each of the examples and the comparative examples, 50 samples of each of the gas separation asymmetric membranes were respectively prepared, the hydrogen permeabilities of 50 samples were measured, the samples having a hydrogen permeability of greater than $1\times10^6$ mL/m$^2$·24 h·atm were determined as membranes with pin-holes (sample errors), and the sample error rate was acquired by the following equation. The film forming properties were evaluated based on the sample error rate and the following evaluation standard.

Sample error rate (%)=100×[number of sample errors/50]

(Evaluation Standard of Film Forming Properties)

AA: the error rate was 1% or less (in other words, errorless)

A: the error rate was greater than 1% and 3% or less (in other words, the number of error was 1)

B: the error rate was greater than 3% and 5% or less (in other words, the number of error was 2)

C: the error rate was greater than 5% (in other words, the number of error was 3 or greater)

AA to B were in acceptable levels.

[Test Example 6-1] Evaluation of Gas Separation Performance (Evaluation of Flat Membrane)

The gas separation performance was evaluated in the following manner using the gas separation asymmetric membranes (flat membranes) prepared in each of the examples and comparative examples.

Permeation test samples were prepared by cutting the gas separation membranes having non-woven fabric such that the diameter of each membrane became 47 mm. Using a gas permeability measurement device manufactured by GTR Tec Corporation, mixed gas in which the volume ratio of carbon dioxide ($CO_2$) to methane ($CH_4$) was 30:70 was adjusted and supplied from the side of the skin layer such that the total pressure on the gas supply side became 4 MPa (partial pressure of $CO_2$:1.2 MPa), the flow rate thereof became 500 mL/min, and the temperature thereof became 45° C. The gas that had been passed through the gas separation membranes was analyzed using gas chromatography. The gas permeabilities of the gas separation membranes were compared to each other by calculating gas permeation rates as gas permeability (Permeance). The unit of gas permeability (gas permeation rate) was expressed by the unit of GPU [1 GPU=1×10$^{-6}$ cm$^3$ (STP)/cm$^2$·sec·cmHg]. The gas separation selectivity was calculated as the ratio ($R_{CO2}/R_{CH4}$) of the permeation rate $R_{CO2}$ of $CO_2$ to the permeation rate $R_{CH4}$ of $CH_4$ of the membrane.

[Test Example 6-2] Evaluation of Gas Separation Performance (Evaluation of Hollow Fiber Membrane)

An element for evaluating permeation performance with an effective length of 8 cm was prepared using six asymmetric hollow fiber membranes, a stainless steel pipe, and an epoxy resin-based adhesive, and the element was mounted on a stainless steel container to obtain a pencil module. The gas separation performance was evaluated under the same conditions as those for the flat membrane except that gas was supplied to outside of the hollow fiber membranes with respect to this module.

[Test Example 7] Evaluation of Folding Resistance

After an operation of folding and returning was performed 50 times on the gas separation asymmetric membranes obtained according to the methods described in each of the examples and the comparative examples, the gas permeabilities were measured again in the same manner as in Test Example 6, and the folding resistance was evaluated from the change in gas separation selectivity based on the following evaluation standard.

Condition of Folding flat membrane: planar flat membranes were folded to a radius of curvature of 10 cm hollow fiber membrane: linear hollow fiber membranes were folded to a radius of curvature of 10 cm —Evaluation Standard of Folding Resistance—

AA: A decreasing rate of gas separation selectivity of a gas separation asymmetric membrane on which a folding operation had been performed to gas separation selectivity ($R_{CO2}/R_{CH4}$) of a gas separation asymmetric membrane which had not been folded was less than 1%.

A: A decreasing rate of gas separation selectivity of a gas separation asymmetric membrane on which a folding operation had been performed to gas separation selectivity ($R_{CO2}/R_{CH4}$) of a gas separation asymmetric membrane which had not been folded was 1% or greater and less than 5%.

B: A decreasing rate of gas separation selectivity of a gas separation asymmetric membrane on which a folding operation had been performed to gas separation selectivity ($R_{CO2}/R_{CH4}$) of a gas separation asymmetric membrane which had not been folded was 5% or greater and less than 20%.

C: A decreasing rate of gas separation selectivity of a gas separation asymmetric membrane on which a folding operation had been performed to gas separation selectivity ($R_{CO2}/R_{CH4}$) of a gas separation asymmetric membrane which had not been folded was 20% or greater.

In addition, the decreasing rate of the gas separation selectivity was calculated by the following equation.

Decreasing rate (%)=100−{100×[(gas separation selectivity of gas separation asymmetric membrane on which folding operation was performed)/(gas separation selectivity of gas separation asymmetric membrane which was not folded)

AA to B were in acceptable levels.

[Test Example 8] Wet Heat Aging Test

After the gas separation asymmetric membranes prepared according to the methods described in each of the examples and comparative examples were stored under conditions of 50° C. at a relative humidity of 70% for 24 hours (low temperature thermos-hygrostat of Isuzu Seisakusho, crystal), the gas separation selectivity was measured in the same manner as in Test Example 6. The results are listed in the following table.

[Test Example 9] Toluene Exposure Test

An empty beaker was allowed to stand in a glass container which contained a toluene solvent and to which it was possible to attach a lid to cover the toluene solvent. The gas separation asymmetric membranes prepared in each of the examples and the comparative examples were placed in the beaker, and the glass container was sealed by being covered with the glass lid. Thereafter, the gas separation membranes were stored under a temperature condition of 30° C. for 10 minutes and gas separation selectivity was measured in the same manner as in Test Example 6 described above using this gas separation asymmetric membrane. By performing this toluene exposure test, plasticization resistance of a gas separation membrane with respect to impurity components present in natural gas such as benzene, toluene, or xylene can be evaluated.

The results of each test example are listed in the following tables.

TABLE 1

| | Polyimide compound | Asymmetric membrane | Molar ratio of structural unit | | | | a/c | b/d | Viscosity of NMP solution obtained by dissolving polyimide compound at concentration of 5% by mass [mPa · s] | Glass transition temperature [° C.] |
|---|---|---|---|---|---|---|---|---|---|---|
| | | | a | b | c | d | | | | |
| Example 1 | P-101 | FS-101 | 50.0 | 30.0 | 50.0 | 70.0 | 1.0 | 0.4 | 4.8 | Higher than 200° C. |
| Example 2 | P-101 | HF-101 | 50.0 | 30.0 | 50.0 | 70.0 | 1.0 | 0.4 | 4.8 | Higher than 200° C. |
| Comparative Example 1 | P-102 | FS-102 | 55.0 | 30.0 | 50.0 | 70.0 | 1.1 | 0.4 | 2.1 | 190° C. |
| Comparative Example 2 | P-102 | HF-102 | 55.0 | 30.0 | 50.0 | 70.0 | 1.1 | 0.4 | 2.1 | 190° C. |
| Example a | P-101a | FS-101a | 50.3 | 30.0 | 50.0 | 70.0 | 1.0 | 0.4 | 16.3 | Higher than 200° C. |
| Comparative Example b | P-101b | FS-101b | 50.2 | 30.0 | 50.0 | 70.0 | 1.0 | 0.4 | 25.2 | Higher than 200° C. |
| Example 3 | P-301 | FS-301 | 20.0 | 20.0 | 80.0 | 80.0 | 0.3 | 0.3 | 3.9 | Higher than 200° C. |
| Comparative Example 3 | P-302 | FS-302 | 30.0 | 20.0 | 80.0 | 80.0 | 0.4 | 0.3 | 2.1 | 180° C. |
| Example c | P-301c | FS-301c | 20.3 | 20.0 | 80.0 | 80.0 | 0.3 | 0.3 | 18.5 | Higher than 200° C. |
| Comparative Example d | P-301d | FS-301d | 20.2 | 20.0 | 80.0 | 80.0 | 0.3 | 0.3 | 27.1 | Higher than 200° C. |
| Example 4 | P-501 | HF-501 | 20.0 | 20.0 | 80.0 | 80.0 | 0.3 | 0.3 | 2.9 | Higher than 200° C. |
| Comparative Example 4 | P-502 | HF-502 | 30.0 | 20.0 | 80.0 | 80.0 | 0.4 | 0.3 | 2.0 | 180° C. |
| Example e | P-501e | HF-502 | 20.2 | 20.0 | 80.0 | 80.0 | 0.3 | 0.3 | 15.6 | Higher than 200° C. |
| Comparative Example f | P-501f | HF-502 | 20.1 | 20.0 | 80.0 | 80.0 | 0.3 | 0.3 | 25.3 | Higher than 200° C. |

NMP: N-methylpyrrolidone

TABLE 2

| | Organic solvent in gas separation asymmetric membrane | | | | | | | $R_{CO2}/R_{CH4}$ | | |
|---|---|---|---|---|---|---|---|---|---|---|
| | Detected organic solvent | Content of organic solvent in gas separation membrane [ppm] | Insolubilization rate [% by mass] | Film thickness of compact layer [nm] | Film forming properties | Folding resistance | $CO_2$ permeability [GPU] | Untreated | After wet heat test | After toluene exposure test |
| Example 1 | NMP | 540 | 7 | 140 | AA | AA | 86 | 43 | 42 | 41 |
| Example 2 | NMP | 740 | 6 | 110 | AA | AA | 90 | 41 | 40 | 40 |
| Comparative Example 1 | NMP | 650 | 3 | 110 | C | C | 111 | 34 | 28 | 22 |
| Comparative Example 2 | NMP | 590 | 2 | 60 | C | C | 108 | 32 | 27 | 23 |
| Example a | NMP | 630 | 10 | 130 | A | A | 89 | 42 | 42 | 40 |
| Comparative Example b | NMP | 720 | 12 | 150 | C | B | 135 | 33 | 30 | 28 |
| Example 3 | NMP | 900 | 3 | 80 | AA | AA | 98 | 39 | 37 | 36 |
| Comparative Example 3 | NMP | 490 | 2 | 80 | C | C | 95 | 35 | 31 | 24 |
| Example c | NMP | 530 | 9 | 120 | A | A | 103 | 38 | 35 | 35 |
| Comparative Example d | NMP | 730 | 12 | 160 | C | B | 133 | 33 | 30 | 25 |
| Example 4 | NMP | 1830 | 3 | 120 | A | A | 82 | 40 | 35 | 34 |
| Comparative Example 4 | NMP | 200 | 3 | 90 | C | C | 83 | 31 | 27 | 24 |
| Example e | NMP | 660 | 9 | 150 | A | A | 112 | 39 | 34 | 33 |
| Comparative Example f | NMP | 760 | 13 | 170 | C | B | 152 | 33 | 28 | 23 |

As listed in Tables 1 and 2, in a case where a polyimide compound used for film formation was dissolved in NMP at a concentration of 5% by mass, it was understood that a gas separation asymmetric membrane in which the film forming properties were degraded so that the yield was poor and the flexibility was degraded so that film defects easily occurred was obtained when the viscosity of the solution was lower than the viscosity defined by the present invention.

TABLE 3

| | Polyimide compound | Asymmetric membrane | Molar ratio of structural unit | | | | | | Viscosity of NMP solution obtained by dissolving polyimide compound at concentration of 5% by mass [mPa·s] | Glass transition temperature [° C.] |
|---|---|---|---|---|---|---|---|---|---|---|
| | | | a | b | c | d | a/c | b/d | | |
| Example 1 | P-101 | FS-101 | 50.0 | 30.0 | 50.0 | 70.0 | 1.0 | 0.4 | 4.8 | Higher than 200° C. |
| Example 5 | P-103 | FS-103 | 90.0 | 80.0 | 10.0 | 20.0 | 9.0 | 4.0 | 5.1 | Higher than 200° C. |
| Example 6 | P-401 | HF-401 | 20.0 | 20.0 | 80.0 | 80.0 | 0.3 | 0.3 | 3.9 | Higher than 200° C. |
| Example 7 | P-402 | HF-402 | 20.0 | 60.0 | 80.0 | 40.0 | 0.3 | 1.5 | 4.0 | Higher than 200° C. |
| Example 8 | P-403 | HF-403 | 10.0 | 20.0 | 90.0 | 80.0 | 0.1 | 0.3 | 4.1 | Higher than 200° C. |
| Example 9 | P-601 | HF-601 | 60.0 | 70.0 | 40.0 | 30.0 | 1.5 | 2.3 | 3.5 | Higher than 200° C. |
| Example 10 | P-602 | HF-602 | 60.0 | 100 | 40.0 | 0.00 | 1.5 | — | 3.6 | Higher than 200° C. |
| Example 11 | P-701 | FS-701 | 60.0 | 100 | 40.0 | 0.00 | 1.5 | — | 3.9 | Higher than 200° C. |
| Example 12 | P-702 | FS-702 | 40.0 | 100 | 60.0 | 0.00 | 0.7 | — | 4.1 | Higher than 200° C. |
| Example 13 | P-703 | FS-703 | 10.0 | 100 | 90.0 | 0.00 | 0.1 | — | 4.2 | Higher than 200° C. |

TABLE 4

| | Organic solvent in gas separation asymmetric membrane | | | | | | | | $R_{CO_2}/R_{CH_4}$ | | |
|---|---|---|---|---|---|---|---|---|---|---|---|
| | Detected organic solvent | Content of organic solvent in gas separation membrane [ppm] | Insolubilization rate [% by mass] | Film thickness of compact layer [nm] | Film forming properties | Folding resistance | $CO_2$ permeability [GPU] | Untreated | After wet heat test | After toluene exposure test |
| Example 1 | NMP | 540 | 7 | 140 | AA | AA | 86 | 43 | 42 | 41 |
| Example 5 | NMP | 390 | 6 | 110 | A | A | 77 | 34 | 31 | 27 |
| Example 6 | NEP | 730 | 2 | 100 | AA | AA | 73 | 41 | 40 | 36 |
| Example 7 | NEP | 880 | 2 | 120 | A | A | 71 | 36 | 32 | 27 |
| Example 8 | NEP | 850 | 0 | 110 | B | B | 71 | 34 | 30 | 20 |
| Example 9 | NEP | 650 | 7 | 70 | AA | AA | 85 | 41 | 39 | 38 |
| Example 10 | NEP | 380 | 7 | 50 | B | A | 89 | 34 | 30 | 29 |
| Example 11 | NMP | 390 | 8 | 50 | B | A | 102 | 32 | 31 | 30 |
| Example 12 | DMSO | 300 | 3 | 110 | B | A | 105 | 37 | 30 | 25 |
| Example 13 | DMSO | 300 | 0 | 110 | B | B | 105 | 37 | 29 | 21 |

NEP: N-ethylpyrrolidone
DMSO: dimethylsulfoxide

As listed in Tables 3 and 4, it was understood that the film forming properties and the folding resistance of the gas separation asymmetric membrane can be improved by adjusting the molar ratio of the structural units of the polyimide compound used for film formation.

TABLE 5

| | Polyimide compound | Asymmetric membrane | Molar ratio of structural unit | | | | | | Viscosity of NMP solution obtained by dissolving polyimide compound at concentration of 5% by mass [mPa·s] | Glass transition temperature [° C.] |
|---|---|---|---|---|---|---|---|---|---|---|
| | | | a | b | c | d | a/c | b/d | | |
| Example 1 | P-101 | FS-101 | 50.0 | 30.0 | 50.0 | 70.0 | 1.0 | 0.4 | 4.8 | Higher than 200° C. |
| Example 14 | P-104 | FS-104 | 50.0 | 30.0 | 50.0 | 70.0 | 1.0 | 0.4 | 4.8 | Higher than 200° C. |
| Example 6 | P-401 | HF-401 | 20.0 | 20.0 | 80.0 | 80.0 | 0.3 | 0.3 | 3.9 | Higher than 200° C. |
| Example 15 | P-404 | HF-404 | 20.0 | 20.0 | 80.0 | 80.0 | 0.3 | 0.3 | 3.9 | Higher than 200° C. |

TABLE 6

| | Organic solvent in gas separation asymmetric membrane | | | | | | | | $R_{CO_2}/R_{CH_4}$ | | |
|---|---|---|---|---|---|---|---|---|---|---|---|
| | Detected organic solvent | Content of organic solvent in gas separation membrane [ppm] | Insolubilization rate [% by mass] | Film thickness of compact layer [nm] | Film forming properties | Folding resistance | $CO_2$ permeability [GPU] | Untreated | After wet heat test | After toluene exposure test |
| Example 1 | NMP | 540 | 7 | 140 | AA | AA | 86 | 43 | 42 | 41 |
| Example 14 | — | 0 | 7 | 140 | A | A | 54 | 43 | 42 | 41 |

TABLE 6-continued

| | Organic solvent in gas separation asymmetric membrane | | | | | | | $R_{CO_2}/R_{CH_4}$ | | |
|---|---|---|---|---|---|---|---|---|---|---|
| | Detected organic solvent | Content of organic solvent in gas separation membrane [ppm] | Insolubilization rate [% by mass] | Film thickness of compact layer [nm] | Film forming properties | Folding resistance | $CO_2$ permeability [GPU] | Untreated | After wet heat test | After toluene exposure test |
| Example 6 | NEP | 730 | 2 | 100 | AA | AA | 73 | 41 | 40 | 36 |
| Example 15 | — | 0 | 2 | 100 | A | A | 49 | 41 | 40 | 37 |

As listed in Tables 5 and 6, it was understood that the gas permeability can be improved and the folding resistance can be increased without degrading the gas separation selectivity when the gas separation asymmetric membrane contains a predetermined amount of an organic solvent.

TABLE 7

| | Polyimide compound | Asymmetric membrane | Molar ratio of structural unit | | | | | |
|---|---|---|---|---|---|---|---|---|
| | | | a | b | c | d | a/c | b/d |
| Example 1 | P-101 | FS-101 | 50.0 | 30.0 | 50.0 | 70.0 | 1.0 | 0.4 |
| Example 16 | P-105 | FS-105 | 50.0 | 30.0 | 50.0 | 70.0 | 1.0 | 0.4 |
| Example 17 | P-106 | HF-106 | 50.0 | 30.0 | 50.0 | 70.0 | 1.0 | 0.4 |
| Example 18 | P-201 | HF-201 | 100 | 20.0 | 0.00 | 80.0 | — | 0.3 |
| Example 19 | P-202 | HF-202 | 100 | 20.0 | 0.00 | 80.0 | — | 0.3 |

| | Viscosity of NMP solution obtained by dissolving polyimide compound at concentration of 5% by mass [mPa·s] | Glass transition temperature [°C] | Polymers other than polyimide compound used for dope solution | | Crosslinking (UV) treatment before formation of protective layer |
|---|---|---|---|---|---|
| | | | Type | Proportion in total amount of polymers (% by mass) | |
| Example 1 | 4.8 | Higher than 200° C. | PES | 20 | Performed |
| Example 16 | 4.8 | Higher than 200° C. | PES | 20 | Not performed |
| Example 17 | 4.8 | Higher than 200° C. | None | — | Performed |
| Example 18 | 5.1 | Higher than 200° C. | PES | 20 | Performed |
| Example 19 | 5.1 | Higher than 200° C. | None | — | Performed |

PES: polyethersulfone

TABLE 8

| | Organic solvent in gas separation asymmetric membrane | | | | | | | $R_{CO_2}/R_{CH_4}$ | | |
|---|---|---|---|---|---|---|---|---|---|---|
| | Detected organic solvent | Content of organic solvent in gas separation membrane [ppm] | Insolubilization rate [% by mass] | Film thickness of compact layer [nm] | Film forming properties | Folding resistance | $CO_2$ permeability [GPU] | Untreated | After wet heat test | After toluene exposure test |
| Example 1 | NMP | 540 | 7 | 140 | AA | AA | 86 | 43 | 42 | 41 |
| Example 16 | NMP | 540 | 0 | 140 | A | A | 88 | 34 | 30 | 22 |
| Example 17 | NMP | 490 | 9 | 150 | AA | A | 75 | 42 | 41 | 40 |
| Example 18 | NMP | 500 | 7 | 120 | AA | AA | 90 | 45 | 43 | 43 |
| Example 19 | NMP | 520 | 7 | 110 | AA | A | 68 | 44 | 42 | 42 |

As listed in Tables 7 and 8, it was understood that the gas separation selectivity, the film forming properties, and the folding resistance in higher levels can be achieved by forming an asymmetric membrane using a blended polymer obtained by blending a polyimide compound and polyethersulfone and forming a crosslinked structure through UV irradiation.

TABLE 9-1

| | | | Protective layer | | | | | |
|---|---|---|---|---|---|---|---|---|
| | Polymer | Asymmetric membrane | Siloxane compound 1 [mass ratio] | Siloxane compound 2 [mass ratio] | Additive [mass ratio] | Linked structure between siloxane compounds | Curing method | Si ratio | Content of repeating unit represented by Formula (5) |
| Example 1 | P-101 | FS | Vinyl Q resin [100] (manufactured by Gelest Inc., VQM-135) | Hydrosilyl-modified polydimethylsiloxane [10.0] (manufactured by Gelest Inc., HMS-301) | Karstedt catalyst [0.0500] (manufactured by Sigma-Aldrich Co., LLC., 479527) | —CH$_2$CH$_2$— | 80° C. 5 h | 0.94 | 0.12 |
| Example 20 | P-101 | FS | Epoxy Q resin [100] (manufactured by Shin-Etsu Chemical Co., Ltd., ES1002T) | — | Photoacid generator [1.00] (manufactured by Momentive Performance Materials Inc., UV-9390C) | —CH$_2$CH(OH)— | UV1.5 J/cm$^2$ | 0.97 | 0.12 |
| Example 21 | P-101 | FS | Epoxy PDMS [100] (manufactured by Momentive Performance Materials Inc, UV-9315) | — | Photoacid generator [1.00] (manufactured by Momentive Performance Materials Inc., UV-9390C) | —CH$_2$CH(OH)— | UV1.5 J/cm$^2$ | 0.98 | 0 |
| Example 22 | P-101 | FS | Methacrylate-modified PDMS [100] (manufactured by Shin-Etsu Chemical Co, Ltd., X-22-164E) | Thiol-modified PDMS [50.0] (manufactured by Shin-Etsu Chemical Co, Ltd., X-22-167B) | Photoradical generator [1.00] (manufactured by Tokyo Chemical Industry Co., Ltd., H0991) | —S—CH$_2$CH$_2$— —CH$_2$CH$_2$— | UV1.5 J/cm$^2$ | 0.95 | 0 |
| Example 23 | P-101 | FS | Epoxy Q resin [100] (manufactured by Shin-Etsu Chemical Co, Ltd., ES1002T) | Amine-modified PDMS [10.0] (manufactured by Gelest Inc., AMS-162) | Photoacid generator [1.00] (manufactured by Momentive Performance Materials Inc., UV-9390C) | —CH$_2$CH(OH)NH— | 80° C. 5 h | 0.92 | 0.15 |
| Example 24 | P-101 | FS | Hydroxy-modified PDMS [100] (manufactured by Gelest Inc., DMS-S31) | — | Ti(OiPr)$_4$ [1.00] | —O—Ti—O— | 80° C. 5 h | 0.93 | 0 |
| Example 25 | P-101 | FS | Hydroxy-modified PDMS [100] (manufactured by Gelest Inc., DMS-S31) | — | Al(acac)$_3$ [1.00] | —O—Al—O— | 80° C. 5 h | 0.93 | 0 |
| Example 26 | P-101 | FS | — | — | — | — | — | 0 | — |
| Example 27 | P-101 | FS | Vinyl Q resin [100] (manufactured by Gelest Inc., VQM-135) | Hydrosilyl-modified polydimethylsiloxane [10.0] (manufactured by Gelest Inc., HMS-301) | Karstedt catalyst [0.0500] (manufactured by Sigma-Aldrich Co., LLC., 479527) Al(acac)$_3$ [1.00] | —CH$_2$CH$_2$— —O—Al—O— | 80° C. 5 h | 0.97 | 0.12 |
| Example 9 | P-601 | HF | Vinyl Q resin [100] (manufactured by Gelest Inc., VQM-135) | Hydrosilyl-modified polydimethylsiloxane [10.0] (manufactured by Gelest Inc., HMS-301) | Karstedt catalyst [0.0500] (manufactured by Sigma-Aldrich Co., LLC., 479527) | —CH$_2$CH$_2$— | 80° C. 5 h | 0.93 | 0.12 |
| Example 28 | P-601 | HF | Vinyl Q resin [100] (manufactured by Gelest Inc., VQM-135) | Hydrosilyl-modified polydimethylsiloxane [4.00] (manufactured by Gelest Inc., HMS-301) | Karstedt catalyst [0.0500] (manufactured by Sigma-Aldrich Co., LLC., 479527) | —CH$_2$CH$_2$— | 80° C. 5 h | 0.68 | 0.12 |

TABLE 9-1-continued

| | Polymer | Asymmetric membrane | Siloxane compound 1 [mass ratio] | Siloxane compound 2 [mass ratio] | Additive [mass ratio] | Linked structure between siloxane compounds | Curing method | Si ratio | Content of repeating unit represented by Formula (5) |
|---|---|---|---|---|---|---|---|---|---|
| Example 29 | P-601 | HF | Vinyl Q resin [100] (manufactured by Gelest Inc., VQM-135) | Hydrosilyl-modified polydimethylsiloxane [2.00] (manufactured by Gelest Inc., HMS-301) | Karstedt catalyst [0.0500] (manufactured by Sigma-Aldrich Co., LLC, 479527) | —CH$_2$CH$_2$— | 80° C. 5 h | 0.36 | 0.12 |
| Example 30 | P-601 | HF | Vinyl Q resin [100] (manufactured by Gelest Inc., VQM-135) | — | Karstedt catalyst [0.0500] (manufactured by Sigma-Aldrich Co., LLC, 479527) | — | 80° C. 5 h | 0 | 0.14 |
| Example 31 | P-601 | HF | Acid anhydride-modified PDMS [100] (manufactured by Gelest Inc., DMS-Z21) | Amine-modified PDMS [150] (manufactured by Gelest Inc., AMS-162) | DBU [5.00] | Imide bond | 100° C. 5 h | 0.92 | 0 |
| Example 32 | P-601 | HF | Carboxy-modified PDMS [100] (manufactured by Shin-Etsu Chemical Co., Ltd. X-22-162C) | — | In(acac)$_3$ [1.00] | —O—In—O— | 100° C. 5 h | 0.86 | 0 |
| Example 33 | P-601 | HF | PTFE(Teflon60)[100] | — | — | — | 80° C. 5 h | 0 | 0 |
| Example 34 | P-601 | HF | Nonfunctional PDMS [100] (manufactured by Momentive Performance Materials Inc., Silform flexible resin) | — | — | — | 80° C. 5 h | 0 | 0 |
| Example 35 | P-601 | HF | — | — | — | — | — | 0 | 0 |
| Example 36 | P-601 | HF | Vinyl Q resin [100] (manufactured by Gelest Inc., VQM-135) | Hydrosilyl-modified polydimethylsiloxane [10.0] (manufactured by Gelest Inc., HMS-301) | Karstedt catalyst [0.0500] (manufactured by Sigma-Aldrich Co., LLC, 479527) Al(acac)$_3$ [1.00] | —CH$_2$CH$_2$— —O—Al—O— | 80° C. 5 h | 0.96 | 0.12 |

PDMS: polydimethylsiloxane
OiP: isopropoxide
acec: acetylacetonate
PTFE: polytetrafluoroethylene

TABLE 10

|  | Organic solvent in gas separation asymmetric membrane | | Insolubilization rate [% by mass] | Film thickness of compact layer [nm] | Film forming properties | Folding resistance | CO$_2$ permeability [GPU] | $R_{CO_2}/R_{CH_4}$ | | |
|---|---|---|---|---|---|---|---|---|---|---|
|  | Detected organic solvent | Content of organic solvent in gas separation membrane [ppm] |  |  |  |  |  | Untreated | After wet heat test | After toluene exposure test |
| Example 1 | NMP | 540 | 7 | 140 | AA | AA | 86 | 43 | 42 | 41 |
| Example 20 | NMP | 540 | 7 | 140 | A | A | 79 | 42 | 40 | 38 |
| Example 21 | NMP | 540 | 7 | 140 | A | A | 92 | 41 | 40 | 37 |
| Example 22 | NMP | 540 | 7 | 140 | A | A | 91 | 41 | 39 | 36 |
| Example 23 | NMP | 540 | 7 | 140 | A | A | 88 | 42 | 40 | 39 |
| Example 24 | NMP | 540 | 7 | 140 | A | A | 90 | 39 | 38 | 37 |
| Example 25 | NMP | 540 | 7 | 140 | A | A | 85 | 40 | 38 | 36 |
| Example 26 | NMP | 540 | 7 | 140 | B | B | 81 | 38 | 31 | 21 |
| Example 27 | NMP | 540 | 7 | 140 | AA | AA | 90 | 47 | 45 | 45 |
| Example 9 | NEP | 650 | 6 | 130 | AA | AA | 85 | 41 | 39 | 38 |
| Example 28 | NEP | 650 | 6 | 130 | AA | AA | 85 | 40 | 36 | 34 |
| Example 29 | NEP | 780 | 7 | 80 | AA | AA | 79 | 38 | 35 | 29 |
| Example 30 | NEP | 780 | 7 | 80 | A | B | 88 | 34 | 32 | 22 |
| Example 31 | NEP | 780 | 7 | 80 | A | B | 79 | 36 | 36 | 32 |
| Example 32 | NEP | 780 | 7 | 80 | A | A | 79 | 36 | 32 | 31 |
| Example 33 | NEP | 770 | 6 | 110 | A | B | 38 | 41 | 35 | 32 |
| Example 34 | NEP | 590 | 8 | 110 | B | B | 43 | 42 | 39 | 29 |
| Example 35 | NEP | 590 | 8 | 110 | B | B | 85 | 38 | 31 | 20 |
| Example 36 | NEP | 590 | 8 | 110 | AA | AA | 88 | 47 | 46 | 45 |

In the gas separation asymmetric membranes described in Tables 9-1 and 9-2, the protective layer was formed by changing the siloxane compound used as a raw material or the additive as those listed in Tables 9-1 and 9-2, and the flat membrane was formed according to the method of forming a protective layer in the preparation of FS-101 described above and the hollow fiber membrane was formed according to the method of forming a protective layer in the preparation of HF-101 described above.

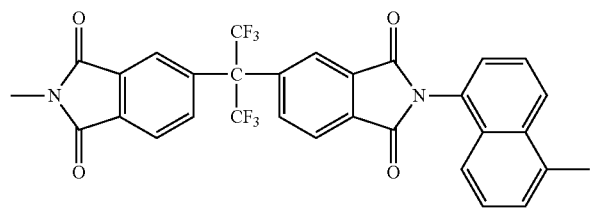

As listed in Tables 9-1, 9-2, and 10, it was understood that the gas separation performance, the film forming properties, and the folding resistance are improved by linking siloxane compounds through a linking group and increasing the Si ratio of the protective layer.

Comparative Example 5

A polyimide compound having the following structural unit was obtained according to the same method as that described in paragraph <0042> of JP2003-62439A. Next, a hollow fiber membrane on which a protective layer was formed was prepared in the same manner as that for the gas separation asymmetric membrane HF-101.

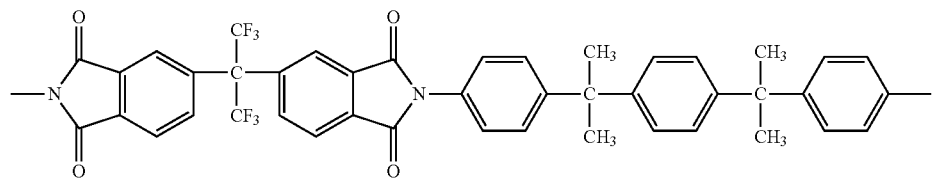

The performance of the obtained asymmetric hollow fiber membrane on which a protective layer was formed was evaluated in the same manner as in the above-described test examples. The results are listed in the following table.

TABLE 11

| | Organic solvent in gas separation asymmetric membrane | | | | | | | $R_{CO_2}/R_{CH_4}$ | | |
| --- | --- | --- | --- | --- | --- | --- | --- | --- | --- | --- |
| | Detected organic solvent | Content of organic solvent in gas separation membrane [ppm] | Insolubilization rate [% by mass] | Film thickness of compact layer [nm] | Film forming properties | Folding resistance | $CO_2$ permeability [GPU] | Untreated | After wet heat test | After toluene exposure test |
| Comparative Example 5 | NEP | 490 | 0 | 130 | C | C | 18 | 21 | 14 | 9 |

As listed in Table 11, it was understood that the performance of the gas separation membrane is greatly degraded in a case where the polyimide compound defined by the present invention is not used.

From the results described above, it was understood that an excellent gas separation method, an excellent gas separation module, and a gas separation device provided with this gas separation module can be provided by applying the gas separation membrane of the present invention.

EXPLANATION OF REFERENCES

10, 20: gas separation asymmetric membrane
1: hole
S: compact layer (skin layer, gas separation layer)
P: porous layer (support layer)
C: siloxane compound layer

What is claimed is:

1. A gas separation asymmetric membrane comprising:

a porous layer having gas permeability;

a compact layer having gas separation capability which is formed on the porous layer; and a siloxane compound layer on the compact layer, wherein the gas separation asymmetric membrane is formed using a polyimide compound which has a structural unit represented by Formula (I) and at least one structural unit selected from a structural unit represented by Formula (II) or a structural unit represented by Formula (III) and in which the viscosity, at 25° C., of a solution obtained by dissolving the polyimide compound in N-methylpyrrolidone at a concentration of 5% by mass is in a range of 2.2 to 22.0 mPa·sec,

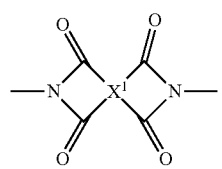

Formula (I)

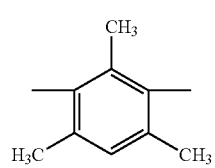

Formula (II)

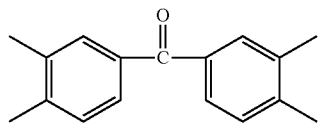

Formula (III)

in the formula, $X^1$ represents a group having a structure represented by Formula (I-a) or (I-b)

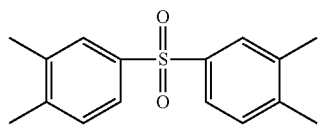

Formula (I-a)

Formula (I-b)

wherein the siloxane compound layer has a structure represented by Formula (1) and a structure represented by Formula (2) or (3)

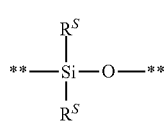

Formula (1)

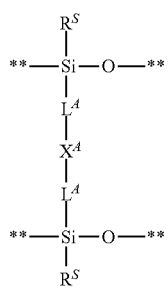

Formula (2)

Formula (3)

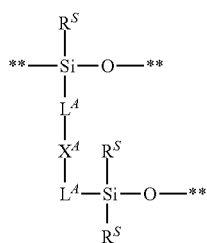

in the formulae, $R^S$ represents an alkyl group or an aryl group, $L^A$ represents a single bond or a divalent linking group, $X^A$ represents a linking group selected from *—O-$M^1$-O—, *—S-$M^1$-S—*, *—O—$CH_2$—O—*, *—S—$CH_2CH_2$—*, *—OC(=O)O—*, *—$CH_2CH_2$—*, and *—C(=O)$O^-N^+(R^d)_3$—*, $M^1$ represents Zr, Fe, Zn, B, Al, Ti, In, or Ga, $R^d$ represents a hydrogen atom or an alkyl group, m and n represent an integer of 2 or greater, the symbol * represents a linking site, and the symbol ** represents a linking site in a siloxane bond.

2. The gas separation asymmetric membrane according to claim 1, wherein the polyimide compound further has a structural unit represented by Formula (IV), Formula (IV)

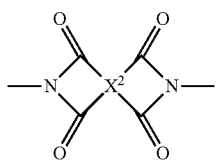

in the formula, $X^2$ represents a group having a structure represented by any of Formulae (IV-a) to (IV-n), (IV-a)

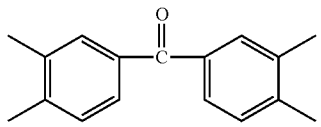

(IV-b)

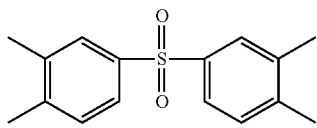

(IV-c)

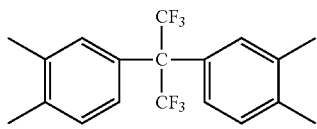

(IV-d)

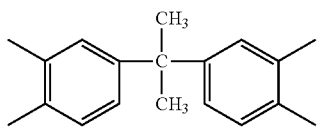

(IV-e)

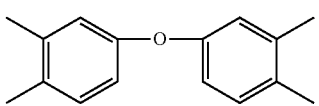

(IV-f)

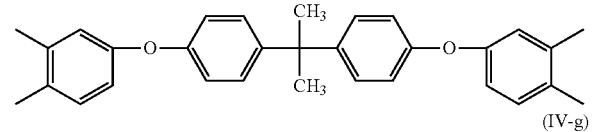

(IV-g)

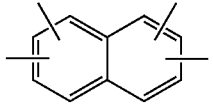

(IV-h)

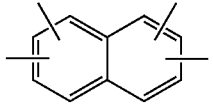

(IV-i)

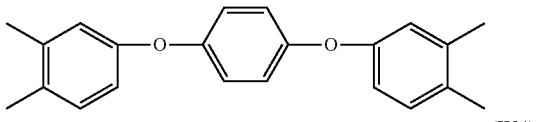

(IV-j)

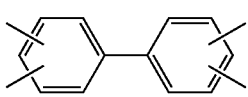

(IV-i)

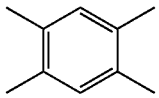

(IV-j)

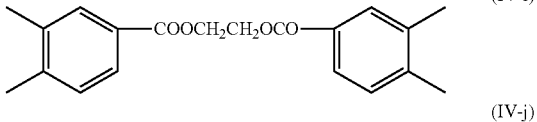

(IV-k)

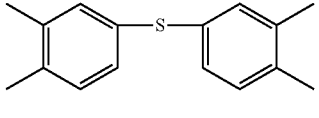

(IV-n)

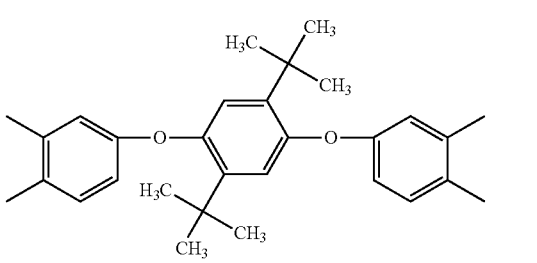

where $X^2$ does not represent a group having a structure represented by Formula (IV-a) in a case where the polyimide compound has the structural unit of Formula (I) in which $X^1$ represents a group having a structure represented by Formula (I-a), and $X^2$ does not represent a group having a structure represented by Formula (IV-b) in a case where the polyimide compound has the structural unit of Formula (I) in which $X^1$ represents a group having a structure represented by Formula (I-b).

3. The gas separation asymmetric membrane according to claim 2,
wherein the polyimide compound further has at least one structural unit selected from structural units represented by each of Formulae (V-a) to (V-n)

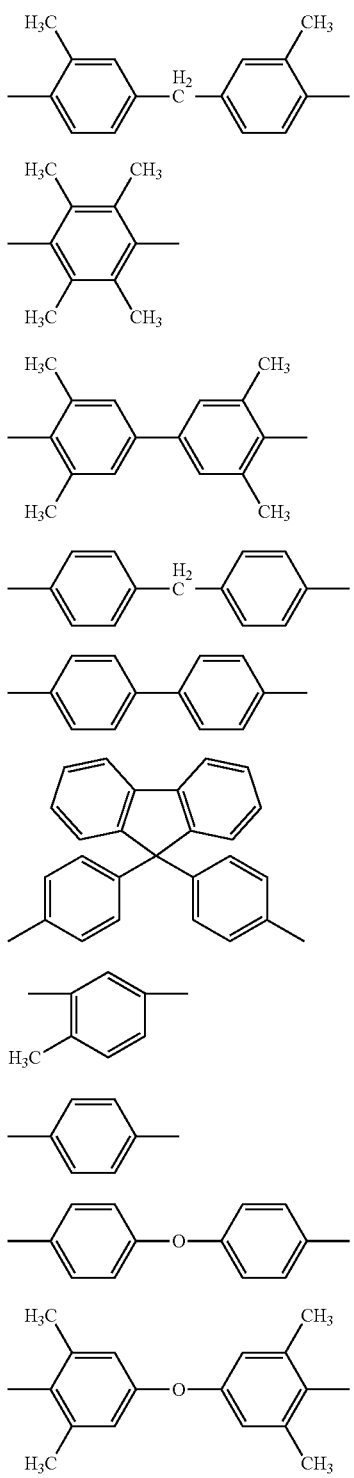

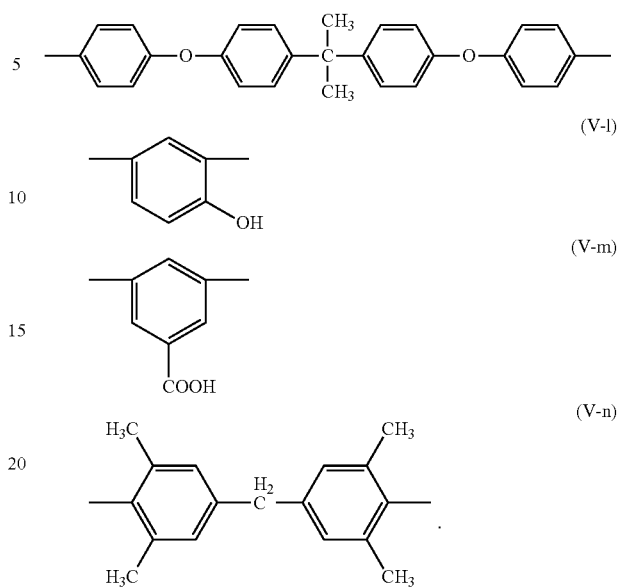

4. The gas separation asymmetric membrane according to claim 3,
wherein a total molar amount a of the structural unit represented by Formula (I) to a total molar amount c of the structural unit represented by Formula (IV) in the polyimide compound satisfies an inequation of $0.2 \leq a/c$ and a total molar amount b of the structural units represented by each of Formulae (II) and (III) to a total molar amount d of the structural units represented by each of Formulae (V-a) to (V-n) in the polyimide compound satisfies an inequation of $0.1 \leq b/d \leq 20.0$.

5. The gas separation asymmetric membrane according to claim 1,
wherein a glass transition temperature of the polyimide compound is higher than 200° C.

6. The gas separation asymmetric membrane according to claim 1, further comprising:
10 to 5000 ppm of an organic solvent.

7. The gas separation asymmetric membrane according to claim 1,
wherein the compact layer contains 1% to 20% by mass of an insoluble component, and the insoluble component is insoluble with respect to a solvent selected from an aprotic polar organic solvent or a protonic polar solvent.

8. The gas separation asymmetric membrane according to claim 1,
wherein a Si ratio of the siloxane compound layer before and after being immersed in chloroform calculated by Equation (I) is in a range of 0.6 to 1.0

Si ratio=(Si—Kα X-ray intensity after immersion in chloroform)/(Si—Kα X-ray intensity before immersion in chloroform).  Equation (I)

9. The gas separation asymmetric membrane according to claim 1,
wherein the structure (i) further has a repeating unit represented by Formula (5)

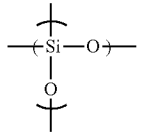

Formula (5)

10. The gas separation asymmetric membrane according to claim 9, wherein the content of the repeating unit represented by Formula (5) in the siloxane compound layer is in a range of 0.01 to 0.55.

11. The gas separation asymmetric membrane according to claim 1, which is used for selective permeation of carbon dioxide from gas containing carbon dioxide and methane.

12. A gas separation module comprising:
the gas separation asymmetric membrane according to claim 1.

13. A gas separation device comprising:
the gas separation module according to claim 12.

14. A gas separation method, comprising:
providing a mixed gas at a side of the compact layer of the gas separation asymmetric membrane according to claim 1, such that the mixed gas partially permeates through the gas separation asymmetric membrane.

15. The gas separation method according to claim 14, wherein the mixed gas contains carbon dioxide and methane, and the carbon dioxide in the mixed gas permeates through the gas separation asymmetric membrane.

* * * * *